United States Patent
Ha et al.

(10) Patent No.: US 9,756,364 B2
(45) Date of Patent: Sep. 5, 2017

(54) STREAMING METHOD AND APPARATUS OPERATING BY INSERTING OTHER CONTENT INTO MAIN CONTENT

(75) Inventors: Ho-jin Ha, Suwon-si (KR); Hyung-tak Choi, Suwon-si (KR); Sun-bal Kim, Suwon-si (KR); O-hoon Kwon, Suwon-si (KR); Jae-yeon Song, Seoul (KR); Sung-ryeul Rhyu, Yongin-si (KR); Ji-Eun Keum, Suwon-si (KR); Seo-young Hwang, Suwon-si (KR); Guanhua Zhang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 12/962,007

(22) Filed: Dec. 7, 2010

(65) Prior Publication Data
US 2011/0145430 A1 Jun. 16, 2011

Related U.S. Application Data

(60) Provisional application No. 61/267,131, filed on Dec. 7, 2009, provisional application No. 61/318,916, filed
(Continued)

(30) Foreign Application Priority Data

Oct. 22, 2010 (KR) .................. 10-2010-0103698

(51) Int. Cl.
*H04N 21/2343* (2011.01)
*H04N 21/235* (2011.01)
(Continued)

(52) U.S. Cl.
CPC ... *H04N 21/23439* (2013.01); *H04L 65/4084* (2013.01); *H04L 65/605* (2013.01);
(Continued)

(58) Field of Classification Search
USPC ......................................... 709/231
See application file for complete search history.

(56) References Cited

U.S. PATENT DOCUMENTS

| 5,784,528 A | 7/1998 | Yamane et al. |
| 6,851,091 B1 | 2/2005 | Honda et al. |

(Continued)

FOREIGN PATENT DOCUMENTS

| CN | 1290895 A | 4/2001 |
| CN | 1459066 A | 11/2003 |

(Continued)

OTHER PUBLICATIONS

International Search Report and Written Opinion issued on Aug. 23, 2011 in counterpart International Application No. PCT/KR2010/008696.

(Continued)

*Primary Examiner* — Angela Nguyen
(74) *Attorney, Agent, or Firm* — Sughrue Mion, PLLC

(57) ABSTRACT

A method and apparatus for reproducing media data are provided. The method includes: receiving a first file including information about a period of first content and information about a period of second content; receiving and reproducing media data of the first content based on the received first file; stopping reproducing of the media data of the first content and receiving and reproducing media data of the second content based on the first file; and receiving and reproducing the media data of the first content when the reproducing the media data of the second content is completed, wherein the information about the period of the second content includes location information about the second media data of the second content or location information of a second file including the location information about the second media data of the second content.

10 Claims, 33 Drawing Sheets

Related U.S. Application Data on Mar. 30, 2010, provisional application No. 61/282,860, filed on Apr. 12, 2010, provisional application No. 61/331,014, filed on May 4, 2010, provisional application No. 61/351,434, filed on Jun. 4, 2010, provisional application No. 61/362,805, filed on Jul. 9, 2010, provisional application No. 61/368,855, filed on Jul. 29, 2010, provisional application No. 61/373,253, filed on Aug. 12, 2010, provisional application No. 61/380,468, filed on Sep. 7, 2010.

(51) Int. Cl.
| | |
|---|---|
| H04N 21/2362 | (2011.01) |
| H04N 21/24 | (2011.01) |
| H04N 21/658 | (2011.01) |
| H04N 21/81 | (2011.01) |
| H04N 21/845 | (2011.01) |
| H04L 29/06 | (2006.01) |
| H04N 21/258 | (2011.01) |
| H04N 21/44 | (2011.01) |
| H04N 21/4722 | (2011.01) |
| H04N 21/858 | (2011.01) |

(52) U.S. Cl.
CPC ..... *H04N 21/2353* (2013.01); *H04N 21/2362* (2013.01); *H04N 21/2402* (2013.01); *H04N 21/25866* (2013.01); *H04N 21/44016* (2013.01); *H04N 21/4722* (2013.01); *H04N 21/6581* (2013.01); *H04N 21/812* (2013.01); *H04N 21/8456* (2013.01); *H04N 21/8586* (2013.01)

(56) References Cited

U.S. PATENT DOCUMENTS

| | | | |
|---|---|---|---|
| 6,895,410 B2 | 5/2005 | Ridge | |
| 7,103,668 B1 | 9/2006 | Corley et al. | |
| 7,421,127 B2 | 9/2008 | Bruls et al. | |
| 7,447,791 B2 | 11/2008 | Leaning et al. | |
| 7,760,990 B2 | 7/2010 | Kato | |
| 7,944,808 B2 | 5/2011 | Lee et al. | |
| 8,176,029 B2 | 5/2012 | Wang | |
| 8,341,662 B1 | 12/2012 | Bassett et al. | |
| 8,578,405 B2 * | 11/2013 | Rashkovskiy et al. | 725/32 |
| 8,619,851 B2 | 12/2013 | Ito | |
| 8,661,105 B2 | 2/2014 | Tian et al. | |
| 2002/0016972 A1 * | 2/2002 | Ogawa et al. | 725/133 |
| 2002/0053085 A1 | 5/2002 | Toguri | |
| 2002/0078444 A1 * | 6/2002 | Krewin et al. | 725/35 |
| 2002/0161739 A1 | 10/2002 | Oh | |
| 2003/0061369 A1 | 3/2003 | Aksu et al. | |
| 2003/0072376 A1 | 4/2003 | Krishnamachari et al. | |
| 2003/0177503 A1 | 9/2003 | Sull et al. | |
| 2003/0189649 A1 | 10/2003 | Kuno | |
| 2003/0236895 A1 | 12/2003 | Ohkubo et al. | |
| 2004/0031054 A1 * | 2/2004 | Dankworth et al. | 725/86 |
| 2004/0064572 A1 | 4/2004 | Yamaguchi et al. | |
| 2004/0064573 A1 | 4/2004 | Leaning et al. | |
| 2004/0119814 A1 | 6/2004 | Clisham et al. | |
| 2004/0220966 A1 | 11/2004 | Ridge | |
| 2005/0018873 A1 | 1/2005 | Rhoads | |
| 2005/0047345 A1 | 3/2005 | Suh | |
| 2005/0071491 A1 | 3/2005 | Seo | |
| 2005/0102371 A1 | 5/2005 | Aksu | |
| 2005/0123136 A1 | 6/2005 | Shin et al. | |
| 2005/0135476 A1 | 6/2005 | Gentric et al. | |
| 2005/0160177 A1 | 7/2005 | Kim | |
| 2005/0183120 A1 | 8/2005 | Jain et al. | |
| 2005/0193138 A1 | 9/2005 | Kim | |
| 2005/0193425 A1 | 9/2005 | Sull et al. | |
| 2005/0198282 A1 | 9/2005 | Stahl et al. | |
| 2005/0234892 A1 | 10/2005 | Tamura | |
| 2005/0262541 A1 | 11/2005 | Oota | |
| 2006/0037057 A1 | 2/2006 | Xu | |
| 2006/0075430 A1 * | 4/2006 | Park | H04N 7/17318 725/42 |
| 2006/0120378 A1 | 6/2006 | Usuki et al. | |
| 2006/0126713 A1 | 6/2006 | Chou et al. | |
| 2007/0003251 A1 | 1/2007 | Chung et al. | |
| 2007/0016657 A1 | 1/2007 | Ito | |
| 2007/0025687 A1 | 2/2007 | Kim | |
| 2007/0101164 A1 | 5/2007 | Ando et al. | |
| 2007/0177854 A1 | 8/2007 | Ando et al. | |
| 2008/0040498 A1 | 2/2008 | Setlur et al. | |
| 2008/0069204 A1 | 3/2008 | Uchiike | |
| 2008/0109532 A1 | 5/2008 | Denoual et al. | |
| 2008/0177865 A1 | 7/2008 | Heo et al. | |
| 2008/0195743 A1 | 8/2008 | Brueck et al. | |
| 2008/0250449 A1 * | 10/2008 | Torkos | 725/34 |
| 2008/0301380 A1 | 12/2008 | Itho | |
| 2009/0010273 A1 | 1/2009 | Green et al. | |
| 2009/0018681 A1 | 1/2009 | Lee et al. | |
| 2009/0031007 A1 | 1/2009 | Boic et al. | |
| 2009/0049489 A1 * | 2/2009 | Kure | 725/93 |
| 2009/0055417 A1 | 2/2009 | Hannuksela | |
| 2009/0089535 A1 | 4/2009 | Lohmar et al. | |
| 2009/0097819 A1 | 4/2009 | Dui et al. | |
| 2009/0106082 A1 * | 4/2009 | Senti | G06Q 30/02 705/7.33 |
| 2009/0106288 A1 | 4/2009 | Yang et al. | |
| 2009/0110060 A1 | 4/2009 | Cortes et al. | |
| 2009/0141888 A1 | 6/2009 | Kim et al. | |
| 2009/0204487 A1 | 8/2009 | Cansler et al. | |
| 2009/0258594 A1 | 10/2009 | Martin-Cocher et al. | |
| 2009/0300145 A1 * | 12/2009 | Musayev et al. | 709/219 |
| 2010/0046611 A1 | 2/2010 | Toma et al. | |
| 2010/0138489 A1 | 6/2010 | Corley et al. | |
| 2011/0029649 A1 | 2/2011 | Tian et al. | |
| 2011/0119394 A1 | 5/2011 | Wang et al. | |
| 2014/0156808 A1 * | 6/2014 | Logan | G06F 17/30053 709/219 |
| 2015/0256585 A1 | 9/2015 | Brueck et al. | |
| 2016/0323342 A1 | 11/2016 | Luby et al. | |

FOREIGN PATENT DOCUMENTS

| | | | |
|---|---|---|---|
| CN | 1481643 A | 3/2004 | |
| CN | 1559119 A | 12/2004 | |
| CN | 1568620 A | 1/2005 | |
| CN | 1575603 A | 2/2005 | |
| CN | 1592418 A | 3/2005 | |
| CN | 1625880 A | 6/2005 | |
| CN | 1698378 A | 11/2005 | |
| CN | 1764974 A | 4/2006 | |
| CN | 1784652 A | 6/2006 | |
| CN | 1787422 A | 6/2006 | |
| CN | 1902865 A | 1/2007 | |
| CN | 1985321 A | 6/2007 | |
| CN | 1988547 A | 6/2007 | |
| CN | 101014947 A | 8/2007 | |
| CN | 101018323 A | 8/2007 | |
| CN | 101247511 A | 8/2008 | |
| CN | 101321265 A | 12/2008 | |
| CN | 101365128 A | 2/2009 | |
| CN | 101371307 A | 2/2009 | |
| CN | 101459809 A | 6/2009 | |
| CN | 101518027 A | 8/2009 | |
| CN | 101521583 A | 9/2009 | |
| EP | 1 043 892 A1 | 10/2000 | |
| EP | 1395014 B1 | 6/2006 | |
| EP | 2117143 A2 | 11/2009 | |
| JP | 06-252876 A | 9/1994 | |
| JP | 2000-013761 A | 1/2000 | |
| JP | 2000-341640 A | 12/2000 | |
| JP | 2001-024994 A | 1/2001 | |
| JP | 2001-359081 A | 12/2001 | |
| JP | 2003-087737 A | 3/2003 | |
| JP | 2003-111048 A | 4/2003 | |
| JP | 2003-235031 A | 8/2003 | |
| JP | 2004-013283 A | 1/2004 | |
| JP | 2004-88766 A | 3/2004 | |

(56) References Cited

FOREIGN PATENT DOCUMENTS

| | | |
|---|---|---|
| JP | 2004-135307 A | 4/2004 |
| JP | 2004-140584 A | 5/2004 |
| JP | 2004-140654 A | 5/2004 |
| JP | 2004-516717 A | 6/2004 |
| JP | 2004-186890 A | 7/2004 |
| JP | 2004-215074 A | 7/2004 |
| JP | 2004-312304 A | 11/2004 |
| JP | 2004-328204 A | 11/2004 |
| JP | 2005-039667 A | 2/2005 |
| JP | 2005-073138 A | 3/2005 |
| JP | 2005-229153 A | 8/2005 |
| JP | 2005-303927 A | 10/2005 |
| JP | 2006-304232 A | 11/2006 |
| JP | 2006-311328 A | 11/2006 |
| JP | 2007-11584 A | 1/2007 |
| JP | 2007-25959 A | 2/2007 |
| JP | 2007-036666 A | 2/2007 |
| JP | 2007-518294 A | 7/2007 |
| JP | 2007-274142 A | 10/2007 |
| JP | 2008-97381 A | 4/2008 |
| JP | 2008-219267 A | 9/2008 |
| JP | 2008-236667 A | 10/2008 |
| JP | 2009-17345 A | 1/2009 |
| JP | 2009-134700 A | 6/2009 |
| JP | 2009-159625 A | 7/2009 |
| JP | 2013-505680 A | 2/2013 |
| KR | 10-0805308 B1 | 2/2008 |
| KR | 10-2008-0099629 A | 11/2008 |
| KR | 10-2009-0001707 A | 1/2009 |
| KR | 10-2009-0028017 A | 3/2009 |
| KR | 10-2009-0036765 A | 4/2009 |
| KR | 10-2009-0063775 A | 6/2009 |
| KR | 10-0920733 B1 | 10/2009 |
| KR | 10-2010-0007368 A | 1/2010 |
| WO | 02/49343 A1 | 6/2002 |
| WO | 2005/043783 A1 | 5/2005 |
| WO | 2006/105158 A2 | 10/2006 |
| WO | 2007/095834 A1 | 8/2007 |
| WO | 2008/062979 A1 | 5/2008 |
| WO | 2008/130191 A1 | 10/2008 |
| WO | 2009/119394 A1 | 10/2009 |
| WO | 2009/158344 A2 | 12/2009 |

OTHER PUBLICATIONS

International Search Report and Written Opinion issued on Jul. 13, 2011 in counterpart International Application No. PCT/KR2010/008017.
International Search Report and Written Opinion issued on Jul. 15, 2011 in counterpart International Application No. PCT/KR2010/008068.
International Search Report and Written Opinion issued on Jul. 23, 2011 in counterpart International Patent Application No. PCT/KR2010/008015.
International Search Report and Written Opinion issued on Jul. 8, 2011 in counterpart International Patent Application No. PCT/KR2010/008016.
International Search Report and Written Opinion (PCT/ISA/210 and PCT/ISA/237) issued by the International Searching Authority on Nov. 3, 2011 in the International Patent Application No. PCT/KR2011/001898.
Communication, dated Mar. 28, 2012, issued by the International Searching Authority in corresponding International Application No. PCT/KR2011/004064.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
International Search Report for PCT/KR2010/008016 dated Jul. 8, 2011 [PCT/ISA/210 & 220].
Written Opinion for PCT/KR2010/008016 dated Jul. 8, 2011 [PCT/ISA/237].
International Search Report for PCT/KR2010/008060 dated Aug. 16, 2011 [PCT/ISA/210 & 220].
Written Opinion for PCT/KR2010/008060 dated Aug. 16, 2011 [PCT/ISA/237].
International Search Report for PCT/KR2011/001268 dated Nov. 25, 2011 [PCT/ISA/210 & 220].
Written Opinion for PCT/KR2011/001268 dated Nov. 25, 2011 [PCT/ISA/237].
Communication dated Feb. 7, 2014 issued by the European Patent Office in counterpart European Application No. 10830205.0.
Pantos R., et al., "HTTP Live Streaming; draft-pantos-http-live-straming-0.2.txt", Oct. 5, 2009, 20 pgs. total, XP015064407.
Alex Zambelli, "IIS Smooth Streaming Technical Overview", Mar. 31, 2009, 17 pgs. total, XP055009366.
Jin Young Lee et al., "DASH Evaluation Experiment #1: Compositions of Media Presentation (CMP) Proposal Comparison", Oct. 15, 2010, 56 pgs. total, XP030046599.
Wager Zia, "A few comments on LGE proposal about delivery of MPEG-2-TS", Oct. 15, 2010, 3 pgs. total, XP030047157.
Communication dated Feb. 12, 2014 issued by the European Patent Office in counterpart European Application No. 10830206.8.
Communication dated Feb. 12, 2014 issued by the European Patent Office in counterpart European Application No. 10830223.3.
Communication dated Feb. 25, 2014 issued by the European Patent Office in counterpart European Application No. 10830218.3.
Communication dated Mar. 4, 2014 issued by the European Patent Office in counterpart European Application No. 10830204.3.
Jaeyeon Song, et al., "Response to Call for Proposals for HTTP Streaming of MPEG Media standard", Jul. 30, 2010, 60 pgs. total, XP030046369.
Gerard Fernando, et al., "HTTP Streaming Solution-Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014 issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.

(56) References Cited

OTHER PUBLICATIONS

Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated Apr. 27, 2015 issued by the Japanese Patent Office in counterpart Japanese Patent Application No. 2012-538768.
Communication dated Mar. 24, 2015 issued by European Patent Office in counterpart European Application No. 11756585.3.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
Communication dated May 18, 2015, issued by the State Intellectual Property Office of the People's Republic of China in counterpart Chinese Application No. 201080061494.4, 13 pages in Eng and Chinese.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Chen, et al., "Response to the CfP on HTTP Streaming: Adaptive Video Streaming based on AVC", International Organization for Standardisation, MPEG Meeting, Jul. 26-Jul. 30, 2010, Issue No. M17909, pp. 1-20, Geneva, Switzerland, XP030046499.
Communication issued Apr. 1, 2016, issued by the State Intellectual Property Office of the People's Republic of China in counterpart Chinese Patent Application No. 201180027573.8.
Communication issued Apr. 25, 2016, issued by the European Patent Office in counterpart European Patent Application No. 10830204.3.
Communication issued May 9, 2016, issued by the European Patent Office in counterpart European Patent Application No. 11790033.2.
Anonymous, "OIPF Release 1 Specification vol. 2—Media Formats V 1.1" Open IPTV Forum, Oct. 8, 2009, 22 pages total.
Anonymous, "Open IPTV Forum—Functional Architecture—V 1.1" Open IPTV Forum, Jan. 15, 2008, 141 pages total.
Anonymous, "OIPF Release 1 Specification vol. 3—Content Metadata V 1.1", Open IPTV Forum, Oct. 8, 2009, 47 pages total.
Communication dated Oct. 3, 2016, issued by the Japanese Patent Office in counterpart Japanese Patent Application No. 2012-553824 English translation.
Communication dated Oct. 31, 2016, issued by the Korean Intellectual Property Office in counterpart Korean Patent Application No. 10-2010-0103721.
Communication dated Oct. 31, 2016, issued by the Korean Intellectual Property Office in counterpart Korean Patent Application No. 10-2010-0103722.
Communication dated Nov. 7, 2016, issued by the Japanese Patent Office in counterpart Japanese Patent Application No. 2015-167763.
Communication dated Dec. 19, 2016, issued by the Japanese Patent Office in counterpart Japanese Patent Application No. 2015-156368.
Alex Zambelli, "IIS Smooth Streaming Technical Overview", Microsoft Corporation, Mar. 2009, pp. 1-17.
Communication dated Jul. 15, 2016, issued by the Korean Intellectual Property Office in counterpart Korean application No. 10-2010-0103727.
Communication dated Aug. 15, 2016, issued by the Japanese Patent Office in counterpart Japanese application No. 2015-156368.
Communication dated Sep. 12, 2016, issued by the Japanese Patent Office in counterpart Japanese application No. 2012-538764.
Communication dated Aug. 1, 2016, issued by the State Intellectual Property Office of P.R. China in counterpart Chinese application No. 201080061494.4.
Communication dated Aug. 29, 2016, issued by the Japanese Patent Office in counterpart Japanese application No. 2015-159842.
Communication dated Aug. 29, 2016, issued by the Japanese Patent Office in counterpart Japanese application No. 2012-538771.
Qualcomm Incorporated, et al., "3GPP Adaptive HTTP Streaming", Proposal to MPEG HTTP Streaming, 93rd MPEG meeting, Geneva, XP030001643, Jul. 22, 2010, pp. 1-61.
Qualcomm Incorporated, "Adaptive HTTPStreaming: Usage of the 3GPP File Format", 3GPP TSG-SA4 AHI Meeting, SA-AHI172, Mar. 2-4, 2010, Aachen, Germany, XP050437444, pp. 1-8.
Communication dated Sep. 29, 2016, issued by the European Patent Office in counterpart European Application No. 11747701.8.
Qualcomm Incorporated, "Pseudo CR: Adaptive HTTP Streaming—Full Solution Proposal", 3GPP TSG-SA4 #57, S4-100060, Jan. 25-29, 2010, St Julians, Malta, URL:http://www.3gpp.org/ftp/tsg_sa/WG4_CODEC/TSGS4_57/Docs/S4-100060.zip, total 17 pages.
Communication dated Sep. 26, 2016, issued by the Japanese Patent Office in counterpart Japanese application No. 2015-146132.
Huawei Technologies Co., Ltd., "Live Content Support in Static HTTP Streaming", 3GPP TSG-SA4 #56, S4-090857, Nov. 9-13, 2009, Sophia-Antipolis, URL:http://www.3gpp.org/ftp/tsg_sa/WG4_CODEC/TSGS4_56/Docs/S4-090857.zip France, total 6 pages.
Communication dated Jan. 19, 2017, issued by the Korean Intellectual Property Office in counterpart Korean Patent Application No. 10-2010-0103725.
Communication dated Jan. 30, 2017, issued by the Japanese Patent Office in counterpart Japanese Patent Application No. 2015-146132.
Communication dated Feb. 21, 2017, issued by the Korean Intellectual Property Office in counterpart Korean Patent Application No. 10-2010-0103698.
Communication dated Mar. 15, 2017, issued by the Korean Intellectual Property Office in counterpart Korean Patent Application No. 10-2011-0011110.
Communication dated Mar. 28, 2017, issued by the State Intellectual Property Office of the People's Republic of China in counterpart Chinese Patent Application No. 201080061494.4.
Communication from the State Intellectual Property Office of P.R. China dated Dec. 4, 2015 in a counterpart Chinese application No. 201080061494.4.
S. Bradner, "Key words for use in RFCs to Indicate Requirement Levels", Network Working Group, Request for Comments: 2119, BCP: 14, Category: Best Current Practice, Harvard University, Mar. 1997, https://www.ietf.org/rfc/rfc2119.txt, pp. 1-3.
ETSI, "Digital Video Broadcasting (DVB); Specification for the use of Video and Audio Coding in Broadcasting Applications based on the MPEG-2 Transport Stream", ETSI TS 101 154 V1.9.1 (Sep. 2009), Technical Specification, pp. 1-163.
ETSI, "Digital Video Broadcasting (DVB); Transport of MPEG-2 TS Based DVB Services over IP Based Networks", ETSI TS 102 034 V1.3.1 (Oct. 2007), Technical Specification, pp. 1-128.
ITU-T, "Series H: Audiovisual and Multimedia Systems Infrastructure of audiovisual services—Transmission multiplexing and synchronization", Amendment 3: Transport of AVC video data over ITU-T Rec. H.222.0 | ISO/IEC 13818-1 streams, (Mar. 2004), ISO/IEC 13818-1:2000/Amd.3:2004 (E), International Telecommunication Union, total 26 pages.
International Standard, "Information technology—Coding of audio-visual objects—Part 12: ISO base media file format", ISO/IEC 14496-12:2005(E), Second edition Apr. 1, 2005, Corrected version Oct. 1, 2005, total 93 pages.

(56) References Cited

OTHER PUBLICATIONS

International Standard, "Information technology—Coding of audio-visual objects—Part 14: MP4 file format", ISO/IEC 14496-14:2003(E), First edition Nov. 15, 2003, total 18 pages.
International Standard, "Information technology—Coding of audio-visual objects—Part 15: Advanced Video Coding (AVC) file format", ISO/IEC 14496-15:2004(E). First edition Apr. 15, 2004, total 29 pages.
ITU-T, "Series H: Audiovisual and Multimedia Systems Infrastructure of audiovisual services—Coding of moving video", ITU-T Recommendation H.264, (Mar. 2005), International Telecommunication Union, total 382 pages.
International Standard, "Information technology—Generic coding of moving pictures and associated audio information—Part 2: Video", ISO/IEC 13818-2:2013(E), Third edition Oct. 1, 2013, total 13 pages.
ETSI, "Digital Video Broadcasting (DVB); Subtitling systems", ETSI EN 300 743 V1.3.1 (Nov. 2006), European Standard (Telecommunications series), pp. 1-51.
ETSI, "Digital Video Broadcasting (DVB); Specification for conveying ITU-R System B Teletext in DVB bitstreams", ETSI EN 300 472 V1.3.1 (May 2003), European Standard (Telecommunications series), pp. 1-11.
International Standard, "Information technology—Coding of audio-visual objects—Part 3: Audio", ISO/IEC 14496-3:2009(E), Fourth edition Sep. 1, 2009, total 18 pages.
ETSI, "Digital Audio Compression (AC-3, Enhanced AC-3) Standard", ETSI TS 102 366 V1.2.1 (Aug. 2008), Technical Specification, pp. 1-214.
International Telecommunication Union, "Terminal Equipment and Protocols for Telematic Services", Information Technology—Digital Compression and Coding of Continuous-Tone Still Images—Requirements and Guidelines, CCITT, Recommendation T.81, (Sep. 1992), ISO/IEC 10918-1 : 1993(E), total 186 pages.
International Standard, "Information technology—Coding of audio-visual objects—Part 2: Visual", ISO/IEC 14496-2:2004(E), Third edition Jun. 1, 2004, total 18 pages.
ETSI, "Universal Mobile Telecommunications System (UMTS); LTE; Transparent end-to-end Packet-switched Streaming Service (PSS); Protocols and codecs (3GPP TS 26.234 version 9.7.0 Release 9)", ETSI TS 126 234 V9.7.0 (Jan. 2012), Technical Specification, total 191 pages.
ETSI, "Digital cellular telecommunications system (Phase 2+); Universal Mobile Telecommunications System (UMTS); LTE; Transparent end-to-end packet switchedstreaming service (PSS); 3GPP file format (3GP) (3GPP TS 26.244 version 9.0.0 Release 9)", ETSI TS 126 244 V9.0.0 (Jan. 2010), Technical Specification. total 54 pages.

\* cited by examiner

FIG. 4A

```
<Tracks>
    <Track ID="1" Type="Packed" BitRate="200000">
    <Track ID="2" Type="Video" BitRate="400000">
</Tracks>
```

FIG. 4B

```
<RefData Type="HEAD-TS" ID="1">
    <URL>http://www.altova.com/movie1/head1.ref</URL>
</RefData>
<RefData Type="HEAD-TS" ID="2">
    <URL>http://www.altova.com/movie1/head2.ref</URL>
</RefData>
```

FIG. 4C

```
<Fragments NextFragmentsXMLURL="http://www.altova.com/movie1/NextMeta.xml">
    <Fragment StartTime="14:20:00.0Z" Duration="00:00:02.0z" ID="1"
BitRate="200000">
        <URL>http://www.altova.com/movie1/slice1-1.as</URL>
        <RefPointer>1</RefPointer>
    <Fragment StartTime="14:20:00.0Z" Duration="00:00:02.0z" ID="1"
BitRate="400000">
        <URL>http://www.altova.com/movie1/slice2-1.as</URL>
        <RefPointer>2</RefPointer>
</Fragments>
```

FIG. 7

```xml
<Contents xsi:noNamespaceSchemaLocation="samsung_as.xsd" xmlns:xsi="http://www.w3.org/2001/XMLSchema-instance">
  <ContentItem>
    <Title xml:lang="en-us">Example</Title>
    <Synopsis xml:lang="en-us">String</Synopsis>
    <OriginSite>http://asexample.com</OriginSite>
    <OriginStateName>Example</OriginSiteName>
    <ContentID>18888</ContentID>
    <ContentURL VideoCoding="AVC" Duration="14:20:00.00" Size="0" MediaFormat="MP4" DRMSystemID="12" MD5Hash="String" MIMIType="video/MP4"TransferType="AS-CoD" AudioCoding="AAC">http://asexample.com/vod/movies/18888/Meta/MainMeta.xml</ContentURL>
  </ContestItem>
</Contents>
```

FIG. 9A

```xml
<AdaptiveControl xsi:noNamespaceSchemaLocation="samsung_as.xsd' xmlns:xsi='http://www.w3.org/2001/XMLSchema-instance'>
  <URLTemplate>http://asexample.com/vod/movies/18888/Tracks/Seg{TrackID}-{SegmentID}.as</URLTemplate>
  <RefDataURL>http://asexample.com/vod/movies/18888/References/header2.ref</RefDataURL>
  <Track ID="1" Type="Video" Bitrate="500000" StartTime="00:00:00" SegmentDuration="00:00:10" SegmentStartID="1000" SegmentCount="360"/>
  <Track ID="2" Type="Video" Bitrate="1000000" StartTime="00:00:00" SegmentDuration="00:00:10" SegmentStartID="1000" SegmentCount="360"/>
  <Track ID="3" Type="Video" Bitrate="2000000" StartTime="00:00:00" SegmentDuration="00:00:10" SegmentStartID="1000" SegmentCount="360"/>
  <Track ID="4" Type="Audio" Bitrate="64000" StartTime="00:00:00" SegmentDuration="00:00:30" SegmentStartID="1000" SegmentCount="120"/>
  <Track ID="5" Type="I-Frame" Bitrate="500000" StartTime="00:00:00" SegmentDuration="00:00:10" SegmentStartID="1000" SegmentCount="360"/>
</AdaptiveControl>
```

FIG. 9B

```xml
<AdaptiveControl xsi:noNamespaceSchemaLocation="samsung_as.xsd' xmlns:xsi='http://www.w3.org/2001/XMLSchema-instance'>
  <URLTemplate>http://asexample.com/vod/movies/18888/Tracks/Seg{TrackID}-{SegmentID}.as</URLTemplate>
  <NextAdaptiveControlURL>http://asexample.com/live/movies/18888/Meta/NextMeta.xml</NextAdaptiveControlURL>
  <RefDataURL>http://asexample.com/vod/movies/18888/References/header.ref</RefDataURL>
  <Track ID="1" Type="Video" Bitrate="500000" StartTime="10:00:00" SegmentDuration="00:00:06" SegmentStartID="1000" SegmentCount="10"/>
  <Track ID="2" Type="Video" Bitrate="1000000" StartTime="10:00:00" SegmentDuration="00:00:06" SegmentStartID="1000" SegmentCount="10"/>
  <Track ID="3" Type="Video" Bitrate="2000000" StartTime="10:00:00" SegmentDuration="00:00:06" SegmentStartID="1000" SegmentCount="10"/>
  <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="00:00:06" SegmentStartID="1010" SegmentCount="10"/>
    <Track ID="3" Type="Video" Bitrate="2000000" StartTime="10:01:00" SegmentDuration="00:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```xml
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation='samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.re'</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation='samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:02:00" SegmentStartID="1000" SegmentCount="360"/>
    <Track ID="2" Type="Video" Bitrate="1000000" StartTime="00:00:00" SegmentDuration="00:02:00" SegmentStartID="1000" SegmentCount="348"/>
    <Track ID="3" Type="Video" Bitrate="2000000" StartTime="00:00:00" SegmentDuration="00:02:00" SegmentStartID="1000" SegmentCount="348"/>
    <Track ID="4" Type="Video" Bitrate="3000000" StartTime="00:00:00" SegmentDuration="00:02:00" SegmentStartID="1000" SegmentCount="348"/>
    <Track ID="5" Type="Video" Bitrate="4000000" StartTime="00:00:00" SegmentDuration="00:02:00" SegmentStartID="1000" SegmentCount="348"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9G

```
<AdaptiveControl xsi:noNamespaceSchemaLocation="samsung_as.xsd" xmlns:xsi="http://www.w3.org/2001/XMLSchema-instance">
  <NextAdaptiveControlURL>http://asexample.com/live/movies/18888/Meta/NextMeta.xml</NextAdaptiveControlURL>
  <Track ID="1" Type="Packed" BitRate="500000">
    <Segment StartTime="00:00:00.00" Duration="00:02:00.00" ID="1000">
      <URL>http://ad_server.com/ad for adaptive/ad1.ts</URL>
    </Segment>
  </Track>
</AdaptiveControl>
```

FIG. 9H

```
<AdaptiveControl xsi:noNamespaceSchemaLocation="samsung_as.xsd" xmlns:xsi="http://www.w3.org/2001/XMLSchema-instance">
  <URLTemplate>http://asexample.com/vod/movies/18888/Tracks/Seg{TrackID}-{SegmentID}.as</URLTemplate>
  <NextAdaptiveControlURL>http://asexample.com/live/movies/18888/Meta/NextMeta.xml</NextAdaptiveControlURL>
  <RefDataURL>http://asexample.com/vod/movies/18888/References/header.ref</RefDataURL>
  <Track ID="1" Type="Video" Bitrate="500000" StartTime="10:00:00" SegmentDuration="00:00:06" SegmentStartID="1000" SegmentCount="10"/>
  <Track ID="2" Type="Video" Bitrate="1000000" StartTime="10:00:00" SegmentDuration="00:00:06" SegmentStartID="1000" SegmentCount="10"/>
  <Track ID="3" Type="Video" Bitrate="2000000" StartTime="10:00:00" SegmentDuration="00:00:06" SegmentStartID="1000" SegmentCount="10"/>
  <Track ID="4" Type="Audio" language="EN" Bitrate="64000" StartTime="10:00:00" SegmentDuration="00:00:30" SegmentStartID="1000" SegmentCount="2"/>
  <Track ID="5" Type="Audio" language="KR" Bitrate="64000" StartTime="10:00:00" SegmentDuration="00:00:30" SegmentStartID="1000" SegmentCount="2"/>
  <Track ID="6" Type="Subtitle" language="EN" Bitrate="0" StartTime="10:00:00" SegmentDuration="00:00:30" SegmentStartID="1000" SegmentCount="2"/>
  <Track ID="7" Type="Subtitle" language="KR" Bitrate="0" StartTime="10:00:00" SegmentDuration="00:00:30" SegmentStartID="1000" SegmentCount="2"/>
</AdaptiveControl>
```

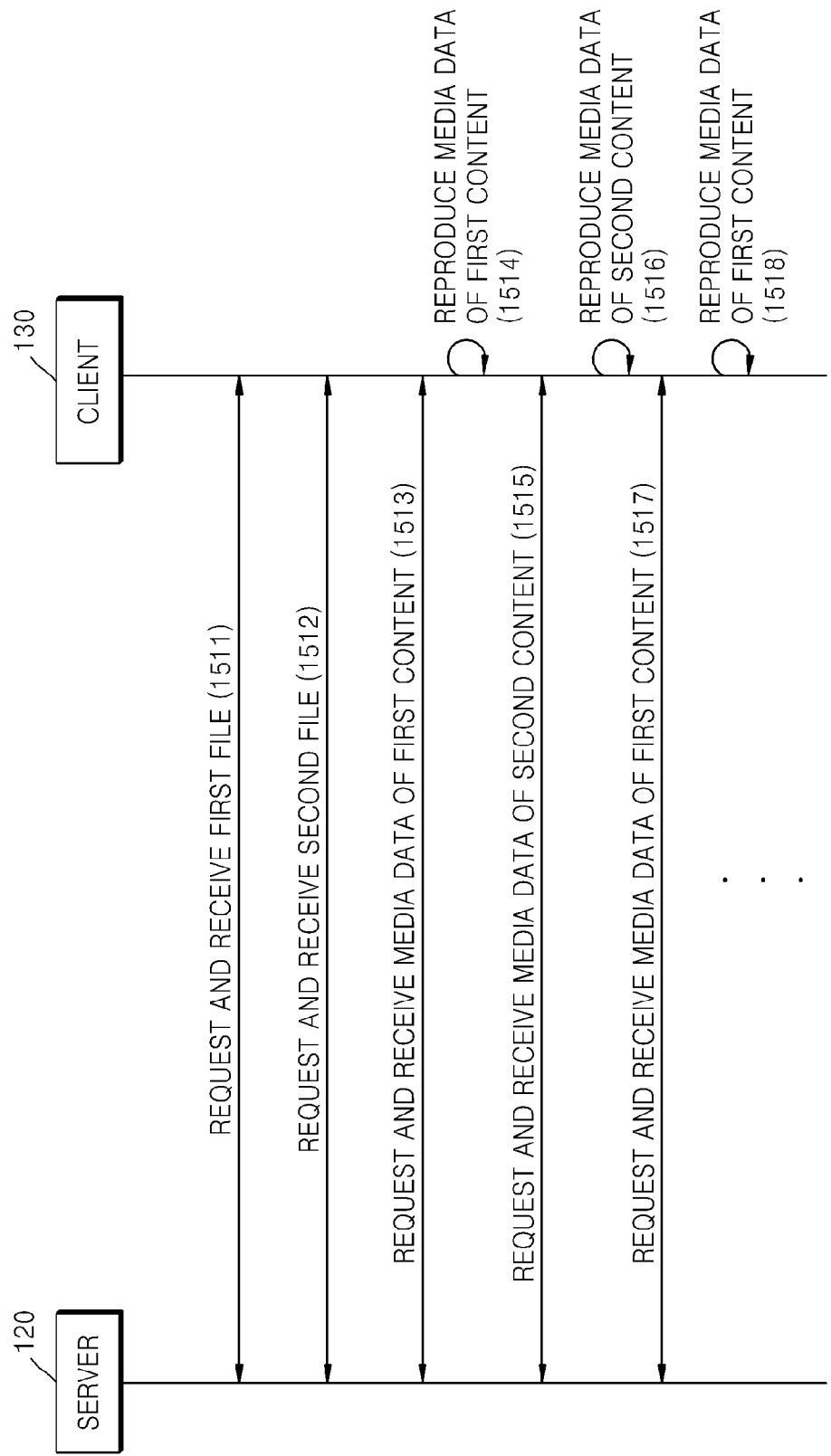

FIG. 16A

```
<MPD>
<Period start = 00:00:00 Type="Internal">
        ----
</Period>
<Period start = 00:15:00 Type="External">
        ---
</Period>
<Period start = 00:15:00 Type="Internal">
        ----
</Period>
</MPD>
```

FIG. 16B

```
<MPD>
<Period start = 00:00:00 >
        ----
</Period>
<Period start = 00:15:00 Type="External">
        ---
</Period>
<Period start = 00:15:00 >
        ----
</Period>
</MPD>
```

FIG. 16C

```
<MPD>
<Period start = 00:00:00 >
        ----
</Period>
<externalPeriod start = 00:15:00 >
        ---
</Period>
<Period start = 00:15:00 >
        ----
</Period>
</MPD>
```

FIG. 16D

```
<MPD>
<Period start = 00:00:00 Type="Internal">
        ____
</Period>
<Period start = 00:15:00 Type="External" externalID="A/a/aaa/a"
>
        ___
</Period>
<Period start = 00:15:00 Type="External" externalID ="B/b/bbb/advertisement"
>
        ___
</Period>
<Period start = 00:15:00 Type="External" externalID ="http://samsung.com/advertisement"
>
        ___
</Period>
<Period start = 00:15:00 Type="Internal">
        ____
</Period>
</MPD>
```

FIG. 16E

```
<MPD>
<Period start = 00:00:00 Type="Internal">
        ____
</Period>
<Period start = 00:15:00 Type="External">
        ___
</Period>
<Period start = 00:16:00 Type="Internal">
        ____
</Period>
</MPD>
```

FIG. 17A

```
<MPD type="OnDemand">
    <ProgramInformation/>
    <Period start="00:00:00" >
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <AD start ="00:03:10" forcePlayOut="true">
    </AD>
    <Period start ="00:03:10">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <AD start="00:05:10" forcePlayOut="true">
    </AD>

</MPD>
```

FIG. 17B

```
<MPD type="OnDemand">
    <ProgramInformation/>
    <Period start="00:00:00" >
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <ProramInsertion>
        <Program startTime="00:03:10" forcePlayOut="true" url=""/>
        <Program startTime="00:05:10" forcePlayOut="true" url=""/>
    </ProgramInsertion >

</MPD>
```

FIG. 17C

```xml
<MPD type="OnDemand">
   <ProgramInformation/>
   <Period start="00:00:00">
      <Representation bandwidth="8196" mimeType="...">
         <SegmentInfo duration="10">
            <Url sourceUrl="http://video.content.com/movie01/>
            ...
         </SegmentInfo>
      </Representation>
   </Period>
   <Period start="00:03:10" forcePlayOut="true">
      <Representation bandwidth="8196" mimeType="...">
         <SegmentInfo duration="10">
            <Url sourceUrl="http://ad.content.com/ad01/">
            ...
         </SegmentInfo>
      </Representation>
   </Period>
   <Period start="00:05:10">
      <Representation bandwidth="8196" mimeType="...">
         <SegmentInfo duration="10">
            <Url sourceUrl="http://video.content.com/movie01/>
            ...
         </SegmentInfo>
      </Representation>
   </Period>
</MPD>
```

FIG. 19A

```
<MPD type="OnDemand">
  <ProgramInformation moreInformationURL="http://ad.information com/programinsertion.xml"/>

<Period start="00:00:00" >
    <Representation bandwidth="8196" mimeType="...">
      <SegmentInfo duration="10">
        <Url sourceUrl="http://video.content.com/movie01/>
        ...
      </SegmentInfo>
    </Representation>
  </Period>

</MPD>
```

FIG. 19B

Programinsertion.xml

```
<xml type="programInsertion">
  <ProramInsertion>
    <Program startTime="00:03:10" forcePlayOut="true" url=""/>
    <Program startTime="00:05:10" forcePlayOut="true" url=""/>
  </ProgramInsertion >
</xml>
```

STREAMING METHOD AND APPARATUS OPERATING BY INSERTING OTHER CONTENT INTO MAIN CONTENT

CROSS-REFERENCE TO RELATED PATENT APPLICATIONS

This application claims the benefit of U.S. Provisional Application No. 61/267,131, filed on Dec. 7, 2009, U.S. Provisional Application No. 61/318,916, filed on Mar. 30, 2010, U.S. Provisional Application No. 61/282,860, filed on Apr. 12, 2010, U.S. Provisional Application No. 61/331,014, filed on May 4, 2010, U.S. Provisional Application No. 61/351,434, filed on Jun. 4, 2010, U.S. Provisional Application No. 61/362,805, filed on Jul. 9, 2010, U.S. Provisional Application No. 61/368,855, filed on Jul. 29, 2010, U.S. Provisional Application No. 61/373,253, filed on Aug. 12, 2010, and U.S. Provisional Application No. 61/380,468, filed on Sep. 7, 2010, and claims priority from Korean Patent Application No. 10-2010-0103698, filed on Oct. 22, 2010 in the Korean Intellectual Property Office, the disclosures of which are incorporated herein in their entirety by reference.

BACKGROUND

1. Field

Apparatuses and methods consistent with exemplary embodiments relate to a streaming method and apparatus, and more particularly, to a streaming method and apparatus that operate by inserting other content into main content while streaming the main content.

2. Description of the Related Art

Examples of a method of transmitting media data through a network include a downloading method and a streaming method. In the streaming method, a server transmits media data in real time, and a client reproduces the received media data in real time.

Unlike the downloading method that starts to reproduce media data after transmitting and receiving the media data, the streaming method transmits and receives the media data in real time through a logical channel set between the server and the client.

SUMMARY

One or more exemplary embodiments provide a streaming method and apparatus that operate by inserting other content into main content while streaming the main content.

One or more exemplary embodiments also provide a computer readable recording medium having recorded thereon a program for executing the method.

According to an aspect of an exemplary embodiment, there is provided a method of reproducing media data performed by a client, the method including: receiving a first file including information about a period of first content and information about a period of second content reproduced by being inserted into the first content while reproducing the first content; receiving and reproducing media data of the first content based on the received first file; stopping reproducing of the media data of the first content and receiving and reproducing media data of the second content based on the received first file; and receiving and reproducing the media data of the first content again when the reproducing the media data of the second content is completed, wherein the information about the period of the second content includes location information about the media data of the second content or location information of a second file including the location information about the media data of the second content.

The information about the period of the first content may include location information about a plurality of media data generated by encoding the first content to have different qualities, wherein each of the plurality of media data includes at least one segment generated by encoding the first content to have a predetermined quality and dividing the encoded first content based on time.

The information about the period of the second content may further include at least one of an insertion time of the second content and type information indicating whether the location information included in the information about the period of the second content is the location information about the media data of the second content or the location information of the second file.

The receiving the first file may include receiving the second file from the server based on the location information of the second file if the information about the period of the second content includes the location information of the second file, and the receiving and reproducing the media data of the second file includes receiving and reproducing the media data of the second content based on the location information about the media data of the second content included in the received second file.

The second file received from the server may be a file selected from among a plurality of files based on at least one of a user profile and preference of the client, wherein the plurality of files include information about different duration times and location information about media data of different contents.

The first file may be an eXtensible Markup Language (XML) file including a first tag about the period of the first content and a second tag about the period of the second content, wherein the first and second tags each include an attribute indicating whether a tag is the first tag about the period of the first content or the second tag about the period of the second content.

According to an aspect of another exemplary embodiment, there is provided a method of transmitting media data by a server, the method including: transmitting, to a client, a first file including information about a period of first content and information about a period of second content reproduced by being inserted into the first content while reproducing the first content; transmitting media data of the first content according to a request of the client based on the first file; transmitting media data of the second content to the client according to a request of the client based on the first file; and transmitting again the media data of the first content to the client after the reproducing the media data of the second content is completed, wherein the information about the period of the second content includes location information of the media data of the second content or location information of a second file including the location information of the media data of the second content.

According to an aspect of another exemplary embodiment, there is provided an apparatus for reproducing media data, the apparatus including: an information receiver which receives a first file including information about a period of first content and information about a period of second content reproduced by being inserted into the first content while reproducing the first content; and a media data reproducer which receives and reproduces media data of the first content based on the received first file, stops reproducing the media data of the first content and receives and reproduces media data of the second content based on the received first file, and receives and reproduces the media data of the first content again when the reproducing the media data of the second content is completed, wherein the information about the period of the second content includes location information about the media data of the second content or location information of a second file including the location information about the media data of the second content.

According to an aspect of another exemplary embodiment, there is provided an apparatus for transmitting media data, the apparatus including: an information transmitter which transmits, to a client, a first file including information about a period of first content and information about a period of second content reproduced by being inserted into the first content while reproducing the first content; and a media data transmitter which transmits media data of the first content according to a request of the client based on the first file, transmits media data of the second content to the client according to a request of the client based on the first file, and transmits again the media data of the first content to the client after reproducing of the media data of the second content is completed, wherein the information about the period of the second content includes location information of the media data of the second content or location information of a second file including the location information of the media data of the second content.

According to an aspect of another exemplary embodiment, there is provided a computer readable recording medium having recorded thereon a program for executing any of the above exemplary methods.

According to an aspect of another exemplary embodiment, there is provided a method of transmitting media data by a server, the method including: transmitting, to a client, a first file including information about a period of first content and information about a period of second content reproduced by being inserted into the first content while reproducing the first content; first transmitting first media data of the first content according to a first request of the client based on the first file; and second transmitting the first media data of the first content to the client after reproducing, by the client, of second media data of the second content is completed, wherein the information about the period of the second content includes location information of the second media data of the second content or location information of a second file including the location information of the second media data of the second content.

BRIEF DESCRIPTION OF THE DRAWINGS

The above and/or other aspects will become more apparent by describing in detail exemplary embodiments thereof with reference to the attached drawings in which:

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each of a plurality of media data, according to an exemplary embodiment;

FIG. 7 illustrates information about content according to an exemplary embodiment;

FIGS. 9A through 9H illustrate media presentation descriptions according to exemplary embodiments;

FIGS. 15A and 15B are flowcharts illustrating methods of reproducing other content by inserting the other content into main content, according to exemplary embodiments;

FIGS. 16A through 16E are media presentation descriptions of main content including information about inserted content, according to exemplary embodiments;

FIGS. 17A through 17C are media presentation descriptions of main content including information about inserted content, according to other exemplary embodiments;

FIGS. 19A and 19B respectively illustrate a media presentation description of main content and a file including information about inserted content, according to exemplary embodiments;

DETAILED DESCRIPTION OF EXEMPLARY EMBODIMENTS

Figure 1:
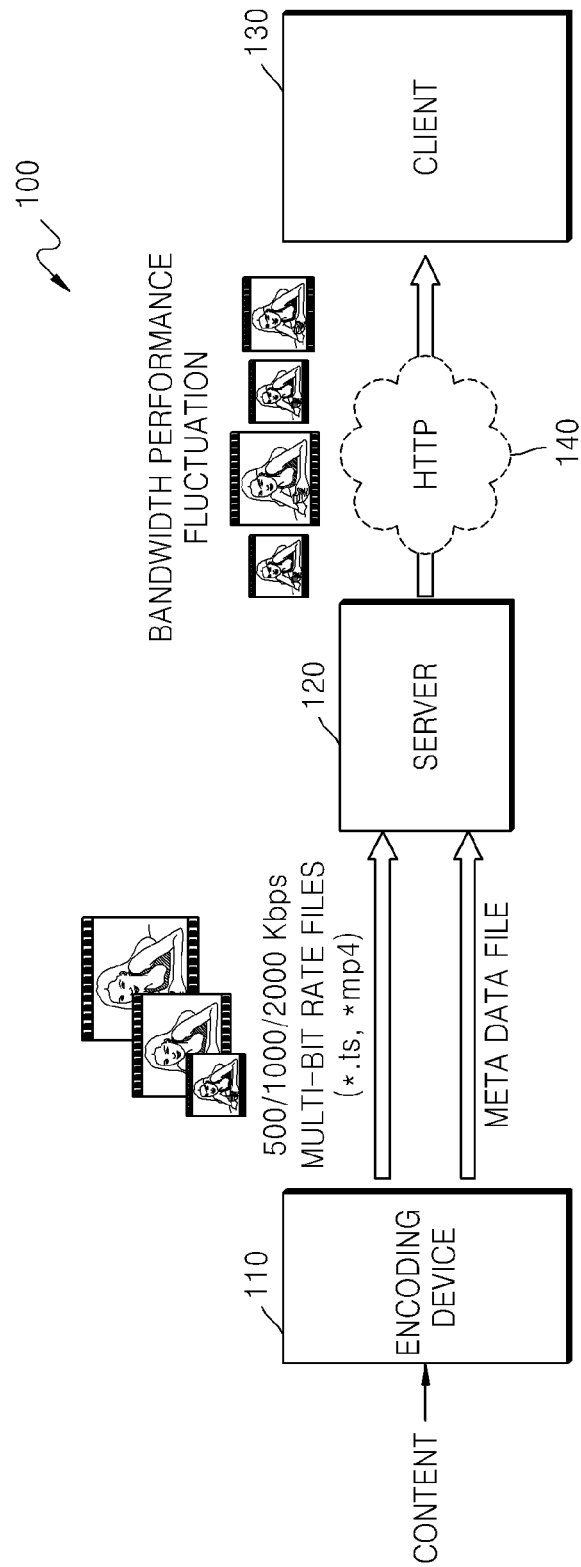
FIG. 1 is a diagram of a streaming system according to an exemplary embodiment.

Hereinafter, exemplary embodiments will be described more fully with reference to the accompanying drawings, in which like reference numerals refer to like elements throughout. Hereinafter, expressions such as "at least one of," when preceding a list of elements, modify the entire list of elements and do not modify the individual elements of the list.

FIG. 1 is a diagram of a streaming system 100 according to an exemplary embodiment.

Referring to FIG. 1, the streaming system 100 includes an encoding device 110, a server 120, and a client 130.

The encoding device 110 generates a plurality of media data corresponding to one input content by encoding the input content to have a plurality of different qualities. A streaming environment may change when the server 120 streams media data to the client 130. For example, a bandwidth of a network 140 for streaming may change, or a hardware source that may be used by the server 120 to transmit media data or by the client 130 to receive media data may change.

Accordingly, the encoding device 110 encodes one content to have different qualities for adaptive streaming according to a fluctuating streaming environment. One content may be encoded to have different qualities by adjusting a factor, such as at least one of a bit rate, a sampling frequency, a resolution, a frame rate, etc. For example, a plurality of media data in 500 Kbps, 1000 Kbps, and 2000 Kbps may be generated by encoding one image content in different resolutions.

The plurality of media data in different qualities are transmitted to the server 120. At this time, information about the content and information about each media data may also be transmitted to the server 120. The information about the content may include information about at least one of a title, a synopsis, a content identifier (ID), a content uniform resource locator (URL), etc., of the content as meta data of the content. The information about each media data may include at least one of a quality, a type, an ID, etc., of each media data, and will be described in detail below with reference to FIGS. 4A through 4C.

The client 130 receives at least one of the information about content and information about each media data, and requests the server 120 for at least one of the plurality of media data based on the received at least one of the information about content and information about each media data. The client 130 determines or estimates a streaming environment, and selects at least one of the plurality of media data based on the estimated streaming environment. The at least one media data that may maintain a suitable quality of service (QoS) in the estimated streaming environment may be selected. Then, the client 130 may transmit a hypertext transfer protocol (HTTP) request for requesting the server 120 to transmit the selected at least one media data.

When a streaming environment is deteriorated and high quality media data is received but continuous reproduction of media data is not possible, low quality media data may be requested from among a plurality of media data. When a streaming environment is improved and high quality media data is received but continuous reproduction of media data is possible, the high quality media data may continue to be requested from among a plurality of media data.

The client 130 may request the server 120 to transmit another media data while receiving a predetermined media data. For example, the client 130, which requested and was receiving first media data that is of low quality in a deteriorated streaming environment, may request the server 120 to transmit second media data that is of a higher quality than the first media data as the streaming environment improves. According to a related art streaming method, when the server 120 and the client 130 set a quality while initially setting a streaming channel, media data is continuously transmitted and received having the same quality. However, according to the current exemplary embodiment, streaming that is adaptive to the streaming environment is possible since the client 130 is able to request the second media data again even while receiving the first media data about the same content.

The client 130 may estimate a streaming environment by using any method of estimating a streaming environment based on, for example, at least one of the bandwidth of the network 140 and the hardware resources that may be used by at least one of the server 120 and the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the media data according to the streaming environment, the server 120 transmits requested media data to the client 130. The server 120 may transmit the requested media data to the client 130 as an HTTP response to the HTTP request.

Each media data may include at least one of a plurality of segments generated by encoding content in different qualities and dividing the encoded content. In other words, each media data generated by encoding the content by the encoding device 110 may include at least one segment divided based on time. The server 120 transmits the content by dividing the content into the plurality of segments and respectively transmitting the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is possible by dividing each media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the high quality. Since media data is divided into a plurality of segments based on time, segments of different media data may be transmitted according to a streaming environment, even during streaming.

Figure 2A:
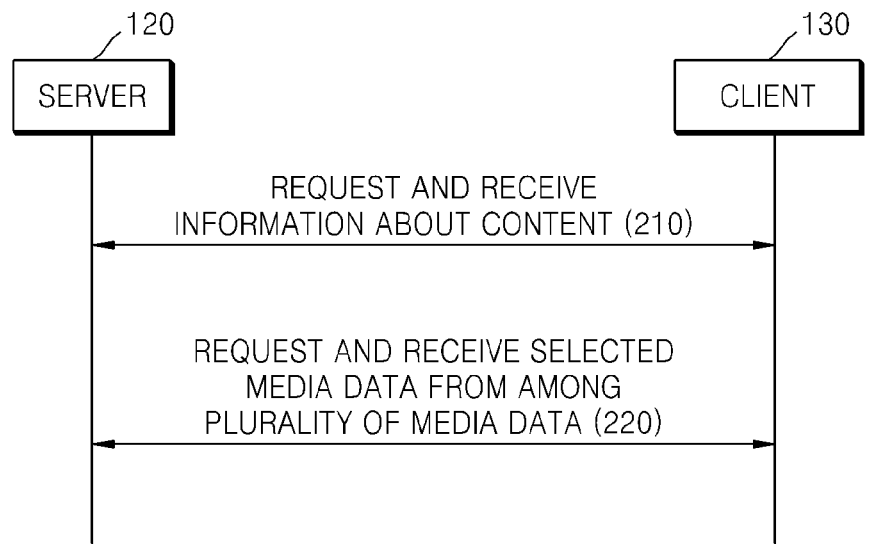
FIGS. 2A and 2B are flowcharts for describing streaming methods according to exemplary embodiments.

FIG. 2A is a flowchart for describing a streaming method according to an exemplary embodiment.

Referring to FIG. 2A, the client 130 transmits a request to the server 120 to transmit information about predetermined content, in operation 210. For example, when a user of the client 130 selects the predetermined content from a user interface displayed on a screen of the client 130, the client 130 requests the server 120 to transmit information about the selected content. The client 130 may transmit an HTTP request requesting the server 120 to transmit information about predetermined content.

Upon receiving the request from the client 130, the server 120 transmits the information about the predetermined content to the client 130. The server 120 may transmit the information about the predetermined content as an HTTP response to the HTTP request to the client 130. The information about the predetermined content may be a content access descriptor (CAD) according to an open IPTV forum (OIPF) standard. The information about the predetermined content will now be described in detail with reference to FIG. 3.

Figure 3:
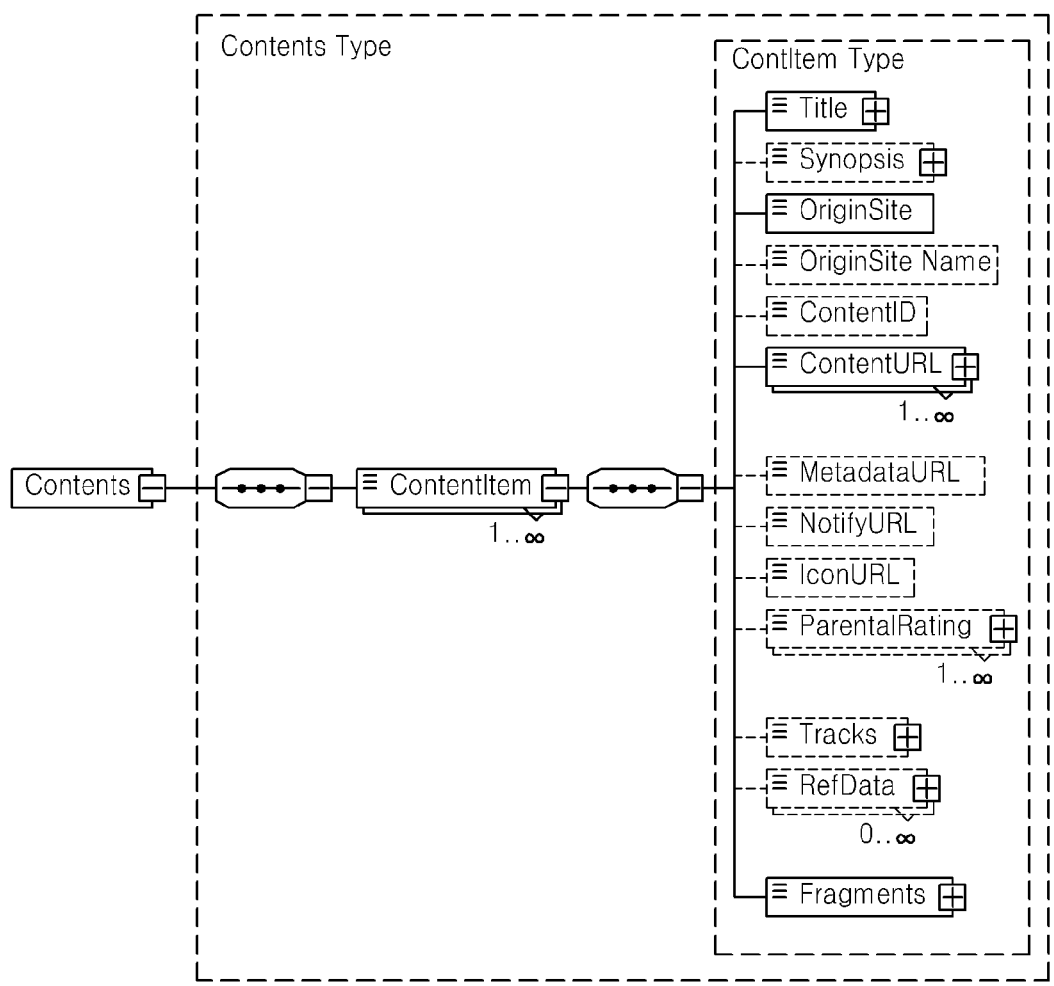
FIG. 3 is a schema of a file including information about content, according to an exemplary embodiment.

FIG. 3 is a schema of a file including information about content, according to an exemplary embodiment. The file may be a CAD, and may be an eXtensible Markup Language (XML) file. A tag and an attribute are separately described, but it would be obvious to one of ordinary skill in the art that an item defined by a tag can be defined by an attribute and an item defined by an attribute can be defined by a tag.

Referring to FIG. 3, the information about content may include "Title," "Synopsis," "OriginSite," and "ContentURL" tags.

Since related art streaming of media data generates one media data by encoding one content to have a predetermined quality, related art information (specifically, CAD according to OIPF) about media content does not include information about a plurality of media data generated by encoding the content to have different qualities.

However, the information about content, according to the current exemplary embodiment, includes information about a plurality of media data generated by encoding one content to have different qualities, and corresponds to "Tracks," "RefData," and "Fragments" tags in FIG. 3.

FIG. 4A illustrates information for defining a plurality of media data, according to an exemplary embodiment.

Referring to FIG. 4A, a "Tracks" tag is information for classifying a plurality of media data generated by encoding content to have different qualities. The "Tracks" tag includes an "ID" attribute, a "Type" attribute, and a "Bitrate" attribute assigned to each media data.

The "ID" attribute defines identifiers assigned (e.g., sequentially) to the plurality of media data, and the "Type" attribute defines whether media data corresponds to audio data, video data, audio/video data, or subtitle data. For example, when the "Type" attribute is "Packed," the media data is audio/video data, and when the "Type" attribute is "Video," the media data is video data. The "Bitrate" attribute defines a bit rate used to encode the media data.

FIG. 4B illustrates information about a header of media data, according to an exemplary embodiment.

Referring to FIG. 4B, a "RefData" tag includes a "Type" attribute and an "ID" attribute. The "Type" attribute defines a media format of a header. For example, when the "Type" attribute is "HEAD-TS," the header is a header of a transport stream format. The "ID" attribute defines a media data of a header. For example, when the "ID" attribute is "1," the header is a header of media data having a media data ID of "1." Also, the "RefData" tag includes information pointing to a header, and a "URL" tag defines a location of a header, i.e., a URL of a header.

The "RefData" tag is a selective element. That is, the "RefData" tag is included in information about content when a header is separated from media data and exists as a separate file, and may not be included in the information about content when the header is combined with the media data.

FIG. 4C illustrates information about at least one segment included in each of a plurality of media data, according to an exemplary embodiment.

Referring to FIG. 4C, a "Fragment" tag, which is a sub tag of a "Fragments" tag, includes the information about at least one segment included in each of the plurality of media data.

The "Fragments" tag includes a "NextFragmentsXMLURL" attribute. When following content is continuously streamed after streaming of one content is completed, like in the case of live streaming, the following content may be seamlessly streamed when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice1-1.as" constituting a first segment generated by encoding content in a first quality as first media data is defined by a "URL" tag, and an ID of a corresponding header is defined by a "RefPointer" tag. Also, a starting time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, it would be obvious to one of ordinary skill in the art that when each media data is divided into a plurality of segments, one "Fragments" tag may include information about at least two segments.

Referring back to FIG. 2A, the client 130 requests the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described above with reference to FIG. 4C, the information about the content may include a "Fragments" tag. In this case, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit the requested media data as an HTTP response with respect to an HTTP request to the client 130.

Figure 2B:
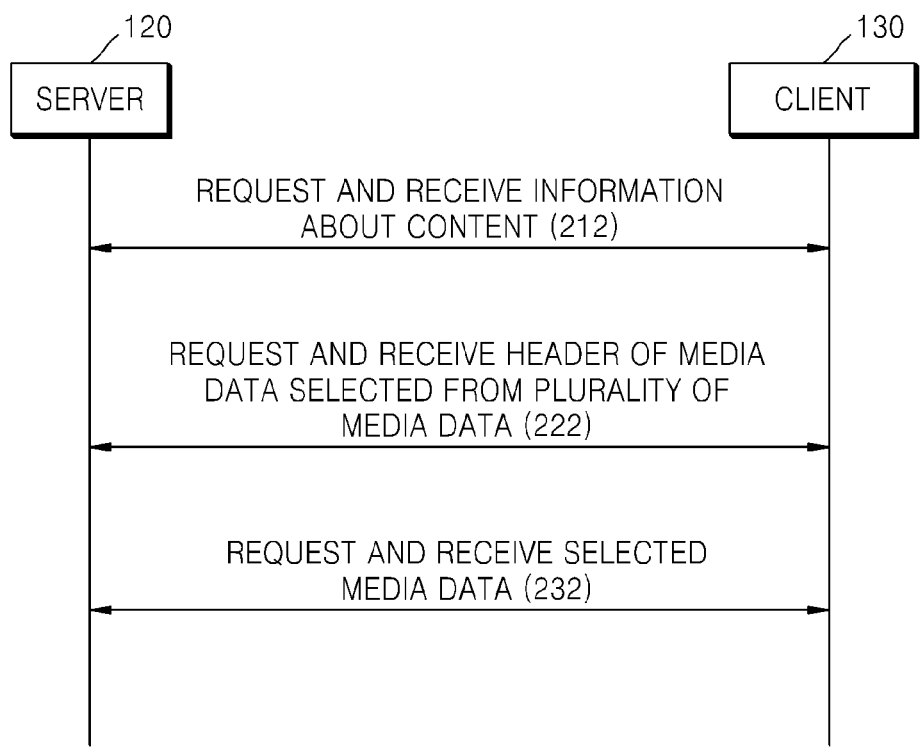

FIG. 2B is a flowchart for describing a streaming method according to another exemplary embodiment. FIG. 2B illustrates the streaming method when a header exists as a separate file from media data.

Referring to FIG. 2B, the client 130 requests the server 120 to transmit information about predetermined content, in operation 212, and the server 120 transmits the information about the content. Operation 212 corresponds to operation 210 of FIG. 2A. As an example, information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. For example, the header of the selected at least one media data is requested by referring to the "Ref-Data" tag included in the information about content received in operation 212.

The server 120 transmits the requested header to the client 130. A header file may be transmitted to the client 130 as an XML file.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130.

Figure 5A:
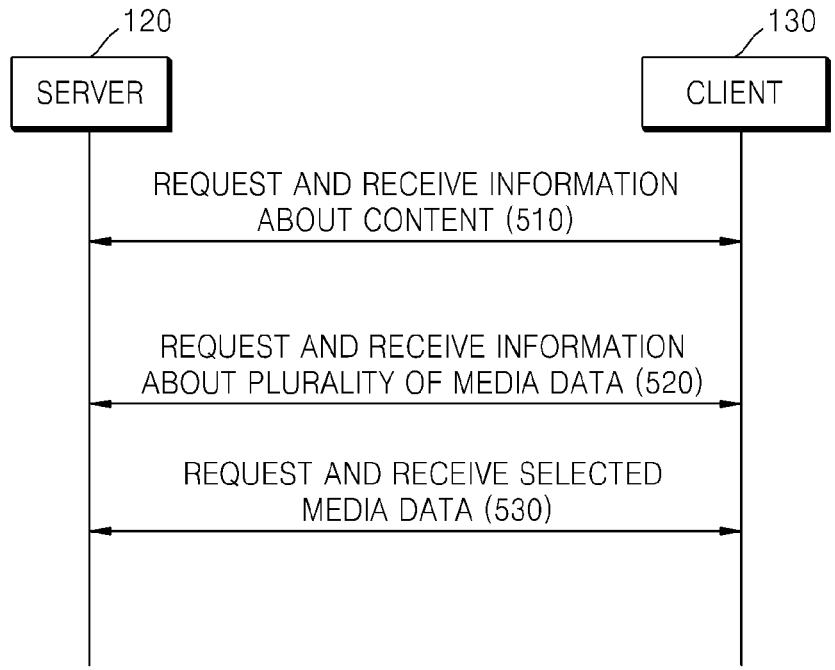
FIGS. 5A and 5B are flowcharts for describing streaming methods according to other exemplary embodiments.

FIG. 5A is a flowchart for describing a streaming method according to another exemplary embodiment.

Referring to FIG. 5A, the client 130 requests the server 120 to transmit information about predetermined content in operation 510, and the server 120 transmits the information about predetermined content. For example, the client 130 transmits an HTTP request for requesting the server 120 to transmit the information about content, and receives the information about content as an HTTP response to the HTTP request. The information about content may be an XML file. The information about content received by the client 130 in operation 510 is different from the information about content received by client 130 in operation 210 of FIG. 2, as will now be described with reference to FIGS. 6 and 7.

Figure 6:
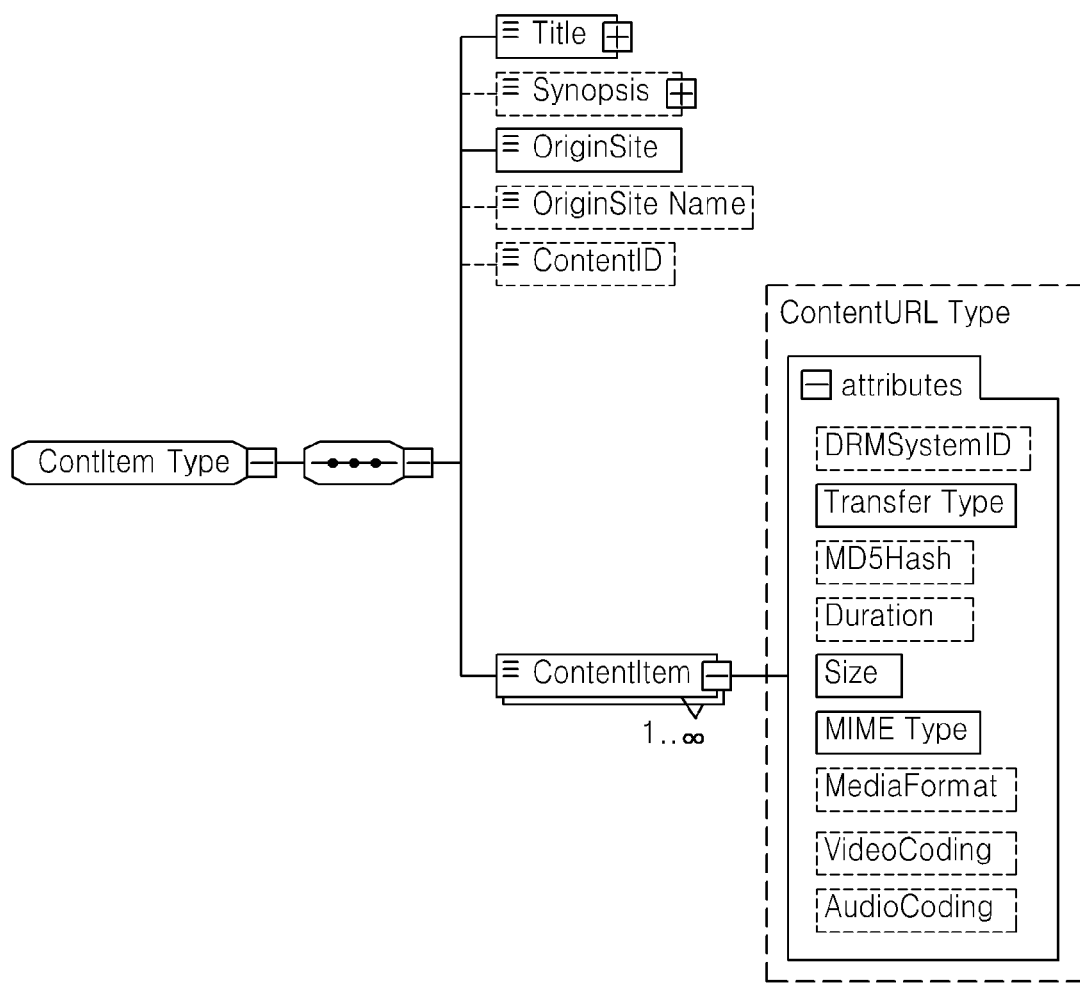
FIG. 6 is a schema of a file including information about content, according to another exemplary embodiment.

FIG. 6 is a schema of a file including information about content, according to another exemplary embodiment.

Referring to FIG. 6, the information about content according to the current exemplary embodiment may include "Title," "Synopsis," "OriginSite," and "ContentURL" tags, like in FIG. 3.

However, in FIG. 3, the information about content includes the information about the plurality of media data by including the "Tracks," "RefData," and "Fragments" tags, whereas in FIG. 6, instead of including the information about the plurality of media data, the information about content defines a URL of a file (hereinafter, referred to as a media presentation description) including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing related art schema of the file containing the information about content.

As shown in FIG. 6, the information about content may include information related to the streaming method, and not include the information about the plurality of media data. In other words, the "ContentURL" tag may include a "Media-Format" attribute defining a format of media data used during streaming, and a "MIMET" attribute defining a type of media data.

Specifically, the "ContentURL" tag may include a "TransferType" attribute defining a service to which streaming of content is related. For example, the "TransferType" attribute may define whether the streaming of content is related to a Content on Delivery (CoD) service, a live service, an adaptive streaming live service, an adaptive streaming CoD service, etc.

FIG. 7 illustrates information about content according to an exemplary embodiment. FIG. 7 may be a CAD according to the OIPF standard.

Referring to FIG. 7, the information about content generated according to the schema of FIG. 6 may define a URL of a media presentation description in a "ContentURL" tag. "http://asexample.com/vod/movies/18888/Meta/Main-Meta.xml" is the URL of the media presentation description. Also, as described with reference to FIG. 6, the "MediaFormat" attribute, the "MIMET" attribute, and the "TransferType" attribute may be defined in the "ContentURL" tag.

Referring back to FIG. 5A, in operation 520, the client 130 requests the server 120 for the information about the plurality of media data, based on the information about content received in operation 510. The client 130 may request a media presentation description from the server 120 through an HTTP request, and may receive the media presentation description as an HTTP response.

The information about content received by the client 130 from the server 120 in operation 510 may include the URL of the media presentation description as described with reference to FIGS. 6 and 7. In this case, the client 130 requests and receives the media presentation description from the server 120 by referring to the "ContentURL" tag of the information about content. The media presentation description will now be described in detail with reference to FIGS. 8A and 8B, and FIGS. 9A through 9H.

Figure 8A:
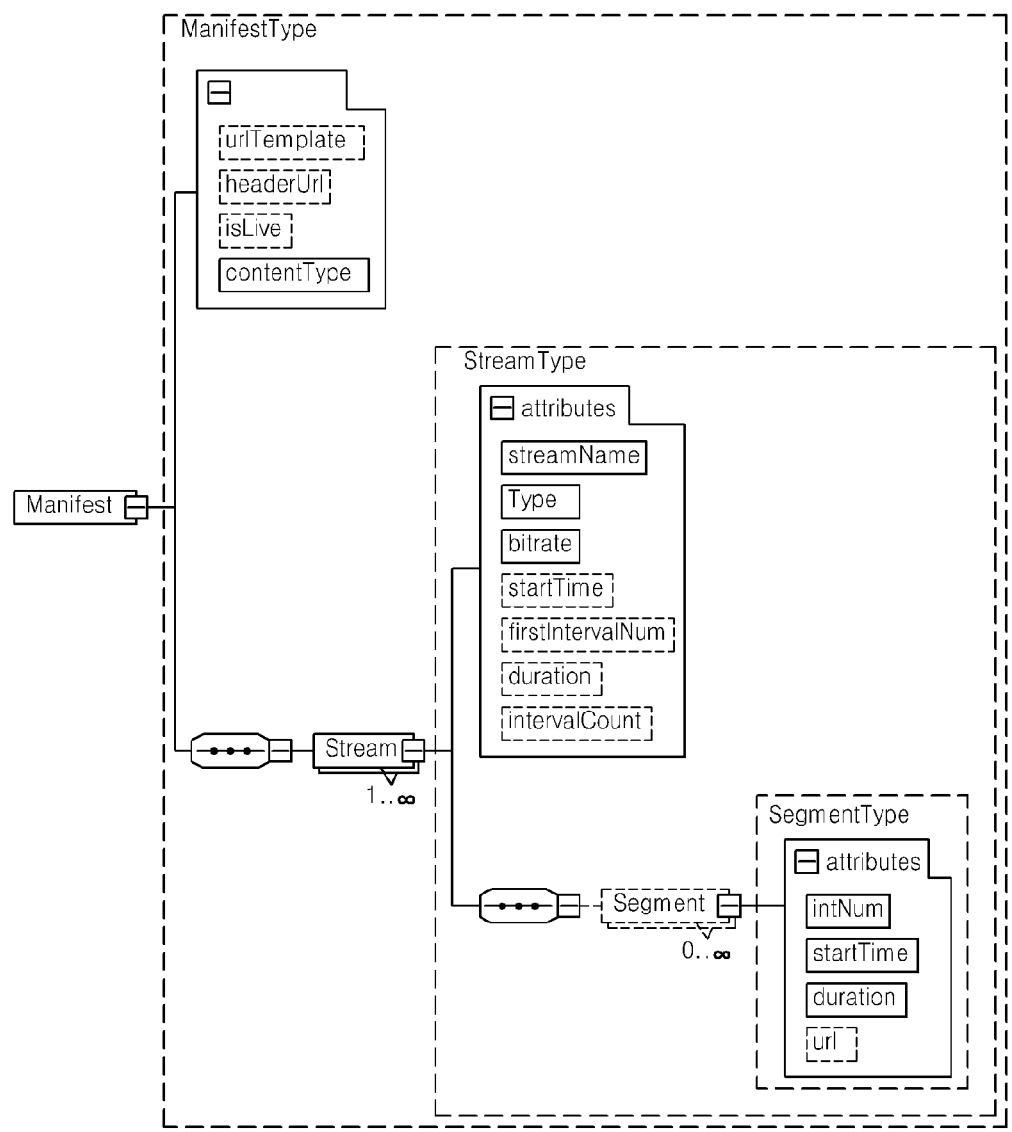
FIGS. 8A and 8B are schemas of a media presentation description according to exemplary embodiments.
Figure 8B:
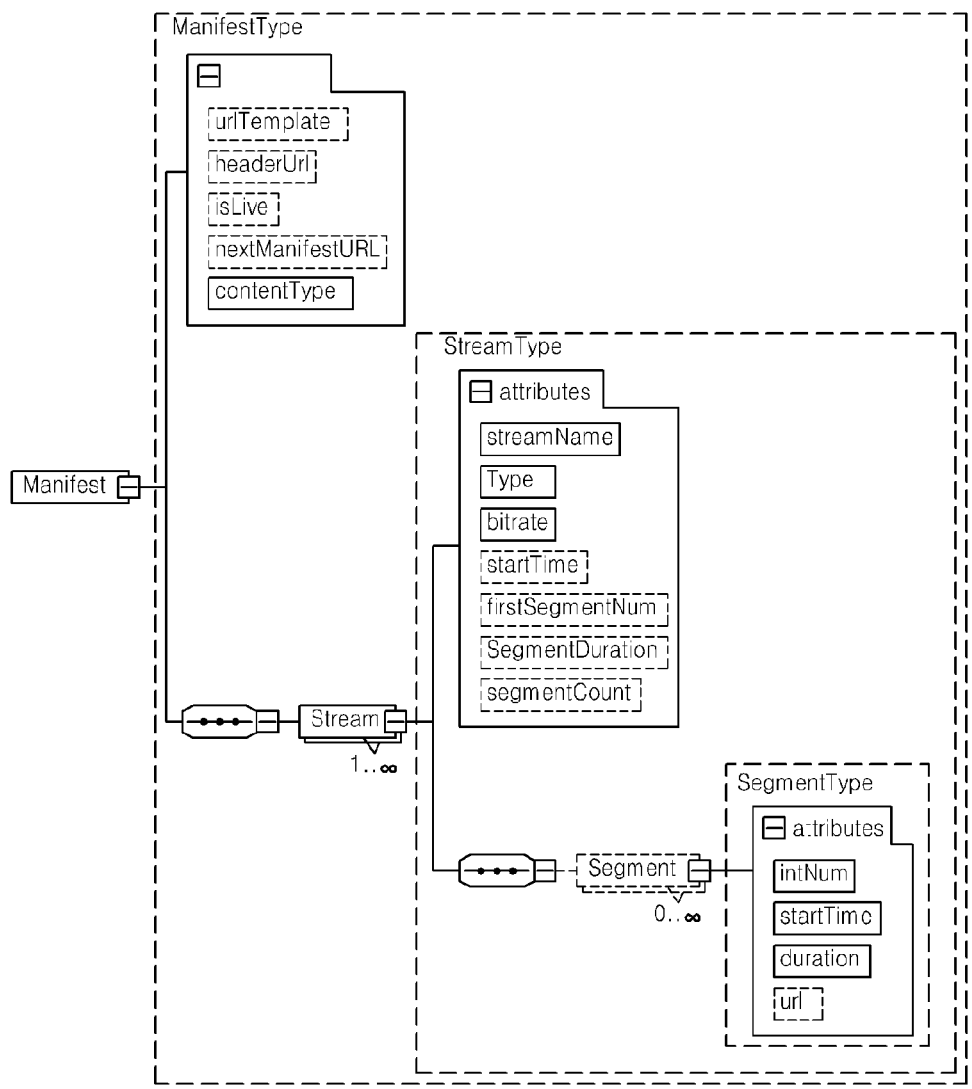

FIGS. 8A and 8B are schemas of a media presentation description according to exemplary embodiments. The media presentation description may comply with the OIPF standard.

Referring to FIG. 8A, the media presentation description according to the current exemplary embodiment includes a template tag about URLs of a plurality of media data, a tag for defining a location of a header, a tag for defining to which service the streaming is related to, a tag for defining a container format of media data, and a tag for defining the plurality of media data.

A "urlTemplate" tag defines a common portion of the URLs of the plurality of media data. For example, if "http://example.com/vod/movie/18888/Track/{TrackID}/Segments/{SegmentID}" is a URL template, a URL of media data may be defined by respectively substituting an ID of each media data and an ID of at least one segment included in each media data for "TrackID" and "SegmentID."

A "headerUrl" tag corresponds to the "RefData" tag described with reference to FIG. 4B. In other words, the "headerUrl" tag defines URLs of headers of the plurality of media data.

An "is Live" tag defines a service related to streaming. For example, when the "is Live" tag is defined as "Live," the streaming is related to a live service, and when the "is Live" tag is defined as "CoD," the streaming is related to a CoD service.

A "contentType" tag defines a container format of media data used during streaming. The "contentType" tag may indicate whether the container format is an MP4 format or an MPEG2-TS format. The container format is an MP4 format or an MPEG2-TS format herein, though it is understood to one of ordinary skill in the art that the container format is not limited thereto, and any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "type" attribute, a "bitrate" attribute, a "startTime" attribute, a "firstIntervalNum" attribute, a "duration" attribute, and an "intervalCount" attribute.

The "streamName" attribute defines a name of media data, and may be an ID of media data. The "type" attribute defines a type of media data, for example, as audio data, video data, or audio/video data. When media data only includes data about an I-frame for a trick play, such information may be defined in the "type" attribute.

The "Bitrate" attribute defines a bit rate of media data, the "startTime" attribute defines a time stamp for specifying a starting time of media data, and the "firstIntervalNum" attribute defines a number of a segment that initially starts.

The "duration" attribute defines a duration time of a segment included in media data, and the "intervalConunt" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a starting time of a corresponding segment. The "Duration" tag defines a duration time of a corresponding segment, and the "url" defines a URL of a corresponding segment.

The "Segment" tag may be a selective tag, and may not be included in the media presentation description if the information about at least one segment included in the media data can be inferred from other attributes of the "Stream" tag. In other words, when content of the "Segment" tag can be inferred from the "startTime," "firstIntervalNum," "duration," and "intervalCount" attributes defined in the "Stream" tag, the "Segment" tag may not be included in the media presentation description. Also, a "url" attribute of the "Segment" tag may not be included if a predetermined template is defined in the "urlTemplate," and the URLs of segments are inferred by substituting each ID of the plurality of media data and an ID of at least one segment included in each media data with the defined predetermined template.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 previously knows information about the following content so as to stream the following content seamlessly. Accordingly, a URL of a media presentation description of the following content to be streamed after current content may be defined by the "nextManifestURL" tag.

FIGS. 9A through 9H illustrate media presentation descriptions according to exemplary embodiments.

Referring to FIG. 9A, the media presentation description according to an exemplary embodiment includes a "URLTemplate" tag, a "RefDataURL" tag, and a plurality of tags respectively defining a plurality of media data.

The "URLTemplate" tag and the "RefDataURL" tag of FIG. 9A respectively correspond to the "urlTemplate" tag and the "RefDataURL" tag of FIGS. 8A and 8B.

An "ID" attribute, a "Type" attribute, a "BitRate" attribute, a "StartTime" attribute, a "SegmentDuration" attribute, a "SegmentStartID" attribute, and a "SegmentCount" attribute of FIG. 9A respectively correspond to the "streamName" attribute, the "type" attribute, the "bitrate" attribute, the "startTime" attribute, the "duration" attribute of the "Stream" tag, the "firstIntervalNum" attribute of the "Stream" tag, and the "intervalCount" attribute of FIGS. 8A and 8B.

The media presentation description of FIG. 9A includes information about three video data generated by encoding content to have different qualities, information about one audio data, and information about media data generated by encoding only I-frames for a trick play. Referring to FIG. 9B, the media presentation description according to an exemplary embodiment further includes a "NextAdaptiveControlURL" tag. The "NextAdaptiveControlURL" tag corresponds to the "nextManifestURL" tag of FIG. 8B. Accordingly, a URL of a media presentation description of following content to be reproduced after current content may be defined by the "NextAdaptiveControlURL" tag.

FIG. 9C shows a media presentation description of the following content, when the URL of the media presentation description of the following content to be reproduced after the current content is defined by the "NextAdaptiveControlURL" tag of FIG. 9B. Comparing the media presentation descriptions of FIGS. 9B and 9C, it can be seen that a "StartTime" attribute is different from the media presentation description of the current content of FIG. 9B, since the media presentation description of FIG. 9C is for the following content.

FIGS. 9D and 9E illustrate media presentation descriptions for selectively controlling high quality video reproduction that a user wants to perform according to an exemplary embodiment. FIG. 9D illustrates the media presentation description when a plurality of media data are generated by encoding one content to have 5 different qualities. Here, the media presentation descriptions of FIGS. 9D and 9E are different in a tag including information about video encoded to have high quality, i.e., a "StartTime" attribute and a "SegmentCount" attribute of media data having an "ID" attribute of "5".

In the present exemplary embodiment, the server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the "SegmentCount" attribute are reproduced from a time defined by the "StartTime" attribute in high quality video.

FIG. 9F illustrates a media presentation description when an advertisement is inserted into content according to an exemplary embodiment. Referring to FIG. 9F, the media presentation description may include information about advertisement content and main content, which have different "StartTime" attributes. The media presentation description may include information about advertisement content, which is reproduced from "00:00:00" to "00:02:00" at a bit rate of "500000," and information about main content, which is reproduced from "00:02:00" at bit rates of "1000000," "2000000," "3000000," or "4000000." The media presentation description of FIG. 9F may be transmitted from the server 120 to the client 130 if the server 120 provides the advertisement content to the client 130 by encoding the advertisement content to have one bit rate, and provides the main content, which have a different "Start- Time" attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. For example, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

A method and apparatus for reproducing the advertisement content by inserting the advertisement content into the main content while streaming the main content according to various exemplary embodiments will be described below with reference to FIGS. 13A through 23.

FIG. 9H illustrates a media presentation description including language and subtitle information, according to an exemplary embodiment. Referring to FIG. 9H, audio data may include information about multiple languages. The media presentation description may include information about audio data of multiple languages, wherein an "ID" attribute is "4" or "5," or information about subtitles of multiple languages, wherein the "ID" attribute is "6" or "7."

Since not only the audio data, but also the subtitle may be divided into a plurality of segments according to time, the audio data and the subtitle may be changed to audio data and a subtitle of another language during streaming.

Referring back to FIG. 5A, the client 130 requests the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit, to the client 130, at least one segment generated by encoding content to have a predetermined quality and dividing the encoded content based on time. The server 120 may transmit the requested media data to the client 130 as an HTTP response to the HTTP request.

Figure 5B:
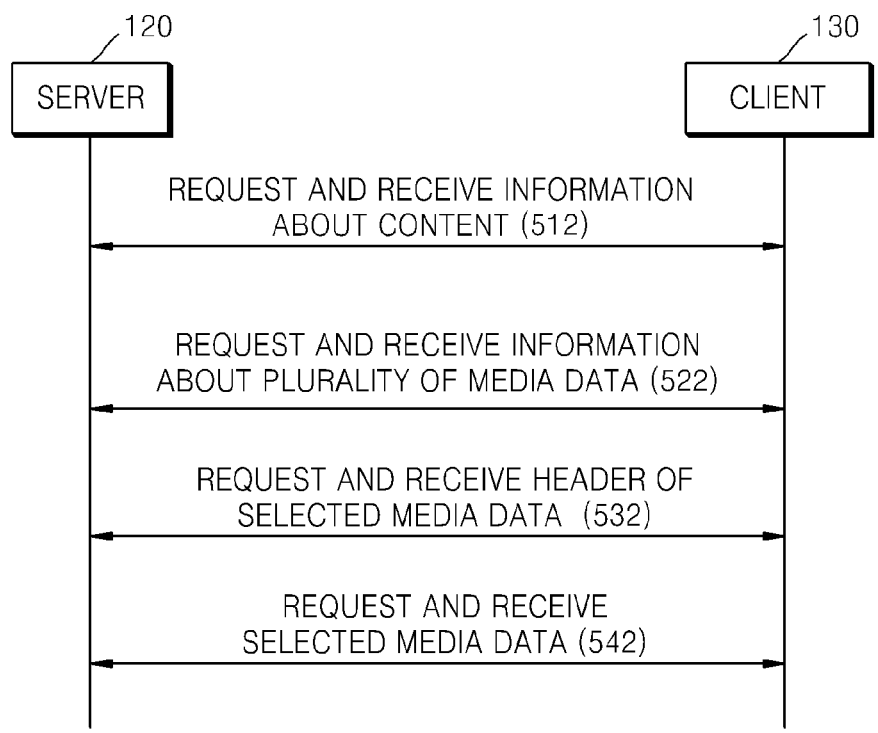

FIG. 5B is a flowchart for describing a streaming method according to another exemplary embodiment.

Referring to FIG. 5B, the client 130 requests the server 120 to transmit information about predetermined content in operation 512, and receives the information about predetermined content from the server 120. For example, the client 130 may transit an HTTP request for requesting the server 120 to transmit the information about predetermined content, and receive the information about predetermined content as an HTTP response to the HTTP request. The information about predetermined content may be included in an XML file.

In operation 522, the client 130 requests the server 120 to transmit information about a plurality of media data based on the information about predetermined content received in operation 512. For example, the client 130 may request the server 120 for a media presentation description through the HTTP request, and receive the media presentation description as the HTTP response.

In operation 532, the client 130 requests a header of media data selected based on the information about a plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130.

In operation 542, the client 130 requests the server 120 to transmit selected media data based on the information about the plurality of media data received in operation 522, and the header received in operation 532. The client 130 requests the server 120 to transmit at least one segment generated by encoding content to have a predetermined quality and dividing the encoded content based on time, and the server 120 transmits the requested at least one segment to the client 130.

Figure 10A:
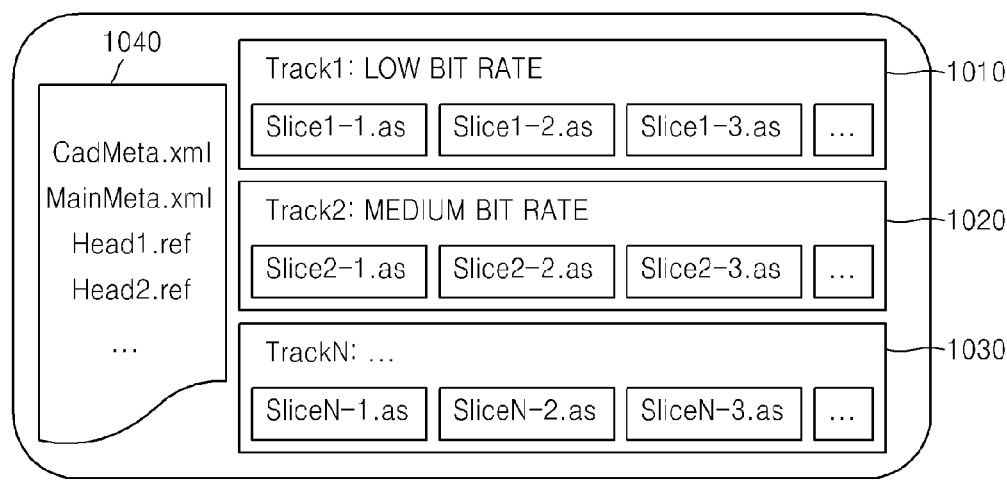
FIGS. 10A through 10C each illustrate a plurality of media data according to exemplary embodiments.
Figure 10B:
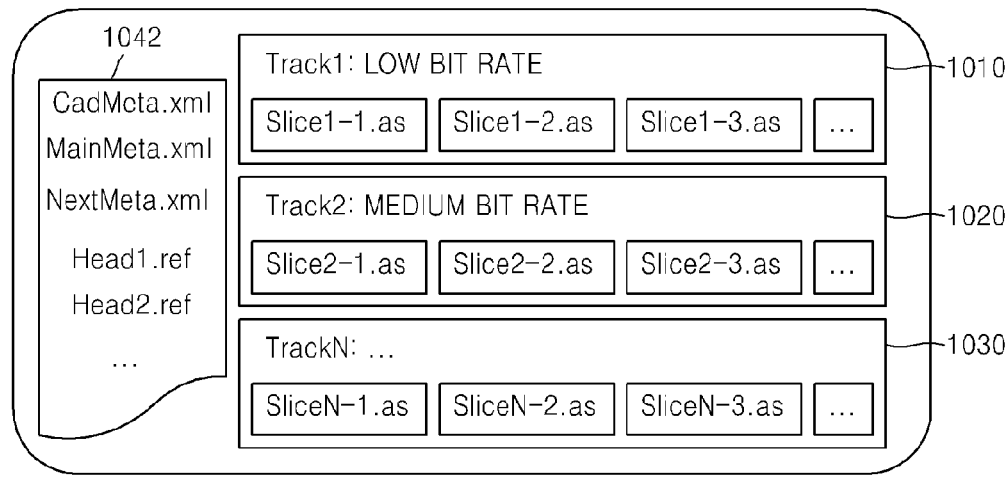
Figure 10C:
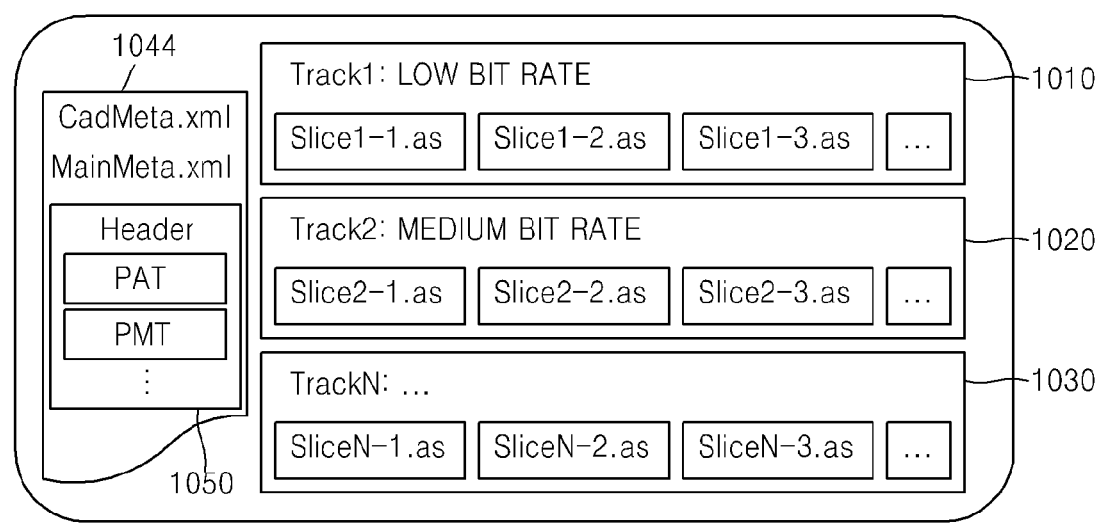

FIGS. 10A through 10C each illustrate a plurality of media data according to exemplary embodiments. For example, FIGS. 10A through 10C each illustrate the plurality of media data included in the server 120 to perform the streaming methods according to FIGS. 5A and 5B.

Referring to FIG. 10A, the server 120 may include a plurality of media data 1010 through 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as," "Slice1-2.as," "Slice1-3.as," "Slice2-1.as," "Slice2-2.as," "Slice2-3.as," "SliceN-1.as," "SliceN-2.as," and "SliceN-3.as" denote at least one segment.

The server 120 may include information 1040 used by the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc., as header files of the plurality of media data 1010 through 1030. Here, the "Head1.ref" file may be a header file of the "Track1," and the "Head2.ref" file may be a header file of the "Track2."

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 used by the client 130 to access the plurality of media data 1010 through 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, header files of the plurality of media data 1010 through 1030 may exist in one header file

1050. Instead of existing for each of the plurality of media data 1010 through 1030, the header files may exist as one header file 1050 and may be included in information 1044 used to access the plurality of media data 1010 through 1030.

For example, when each of the plurality of media data 1010 through 1030 corresponds to an elementary stream, such as an elementary stream according to MPEG-2, the header files of the plurality of media data 1010 through 1030 may be the header file 1050 including a program association table (PAT) and a program map table (PMT). At least one of the PAT and the PMT is separated from the plurality of media data 1010 through 1030 to prepare the header file 1050, and the media presentation description may include information pointing to the header file 1050. For example, the information pointing to the header file 1050 may be URL information of the header file 1050 or information specifying a packet including the header file 1050 in an MPEG-2 transport stream (TS). The header file 1050 including at least one of the PAT and the PMT is an initialization segment, and may be transmitted to the client 130 before segments including payload data, so as to initiate reproduction of the plurality of media data 1010 through 1030.

Referring back to operation 532 of FIG. 5B, the client 130 may obtain the information pointing to the header file 1050 by referring to the media presentation description, and may request the header file 1050 based on the information pointing the header file 1050. After requesting and receiving the header file 1050 based on the information pointing to the header file 1050, at least one of the plurality of media data 1010 through 1030 is selected based on at least one of the PAT and the PMT included in the header file 1050, and the selected at least one media data is requested from the server 120. The PAT and the PMT may be separated as the header file 1050 or included in the plurality of media data 1010 through 1030, and may include an entire list of elementary streams included in the plurality of media data 1010 through 1030 regardless of locations of the PAT and the PMT.

According to MPEG-2, packet IDs (PIDs) defined in the PAT and the PMT are different according to elementary streams. Accordingly, PIDs assigned to each of the plurality of media data 1010 through 1030 may be different. Alternatively, according to another exemplary embodiment, since the plurality of media data 1010 through 1030 generated by encoding one content to have different qualities are elementary streams of the same content, the same PID may be set.

When the plurality of media data 1010 through 1030 correspond to a plurality of elementary streams according to MPEG-2, each of segments included in the plurality of media data 1010 through 1030 may include at least one continuous packetized elementary stream (PES). However, one PES is included in one segment. In other words, one PES is not included in two different segments.

Since a plurality of media data are generated by encoding one content to have different qualities, at least one of presentation time stamps (PTSs) and decoding time stamps (DTSs) included in PESs of the plurality of media data may be aligned according to reproduction times. In other words, if an initial PES of first media data and an initial PES of second media data are content reproduced at the same time, at least one of a PTS and a DTS may be equally set.

Further, when the second media data is reproduced while reproducing the first media data by changing media data according to the streaming environment, at least one of the PTSs and the DTSs may be continuously aligned so that the first and second media data are continuously reproduced. In other words, when the second media data is reproduced while reproducing the first media data by changing media data, at least one of the PTS and the DTS of the last PES before the changing and at least one of the PTS and the DTS of the first PES after the changing may be continuously set.

The at least one of the PTS and the DTS define a time stamp of video data. Accordingly, time stamps of the plurality of media data with respect to video data are aligned according to the reproduction times of the plurality of media data as described above. Such alignment of the time stamps based on the reproduction times may be equally applied to audio data. In other words, like the time stamps of the plurality of media data with respect to the video data, time stamps of the plurality of media data with respect to the audio data may also be aligned according to the reproduction times for adaptive streaming.

Figure 11A:
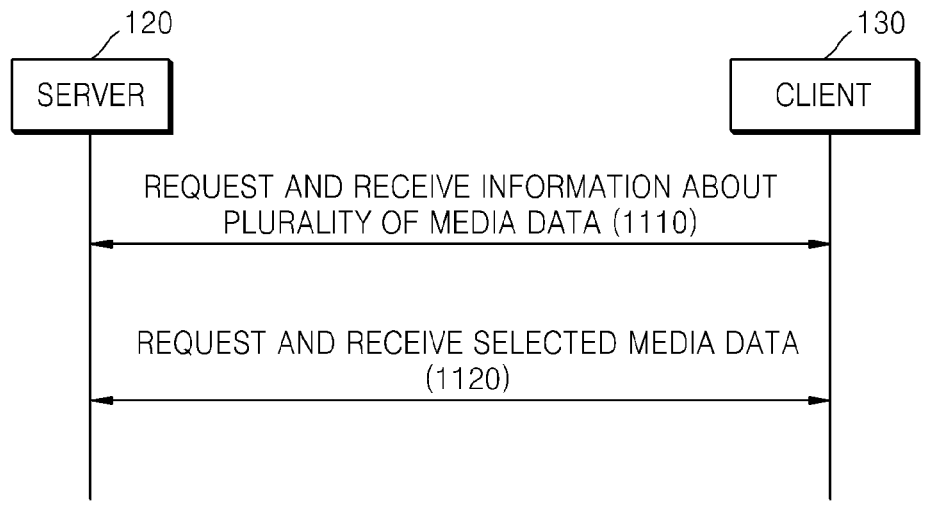
FIGS. 11A and 11B are flowcharts for describing streaming methods according to other exemplary embodiments.

FIG. 11A is a flowchart for describing a streaming method according to another exemplary embodiment.

Referring to FIG. 11A, the client 130 requests information about a plurality of media data from the server 120 in operation 1110. For example, the client 130 may request a media presentation description from the server 120 via an HTTP request, and may receive the media presentation description as an HTTP response. The client 130 requests the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A in that the information about the plurality of media data is requested and received without requesting and receiving information about content.

In operation 1120, the client 130 requests the server 120 to transmit at least one of the plurality of media data. The client 130 selects and requests at least one media data that is encoded to have a quality suitable for the streaming environment by referring to the information about the plurality of media data, and receives the requested at least one media data from the server 120.

Figure 11B:
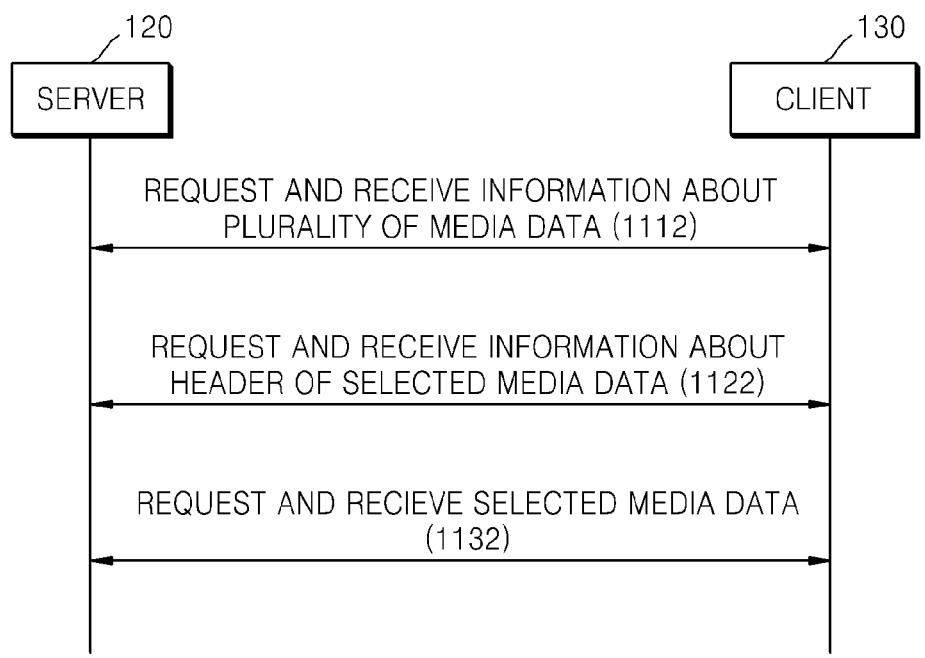

FIG. 11B is a flowchart for describing a streaming method according to another exemplary embodiment.

Referring to FIG. 11B, the client 130 requests the server 120 to transmit information about a plurality of media data and receives the information about the plurality of media data from the server 120 in response to the request, in operation 1112. For example, the client 130 may request the server 120 for a media presentation description through an HTTP request, and receive the media presentation description as an HTTP response.

In operation 1122, the client 130 requests a header of selected media data based on the information about the plurality of media data received in operation 1112. The client 130 requests the header of media data selected according to a streaming environment by referring to the information about the plurality of media data received in operation 1112. In response to the request, the server 120 transmits a file including the header of the selected media data to the client 130.

In operation 1132, the client 130 requests the server 120 to transmit the media data selected based on the information about the plurality of media data received in operation 1112, and the header received in operation 1122. The client 130 requests the server 120 to transmit at least one segment generated by encoding content in a predetermined quality and dividing the encoded content based on time, and the server 120 transmits the requested at least one segment to the client 130.

Figure 12A:
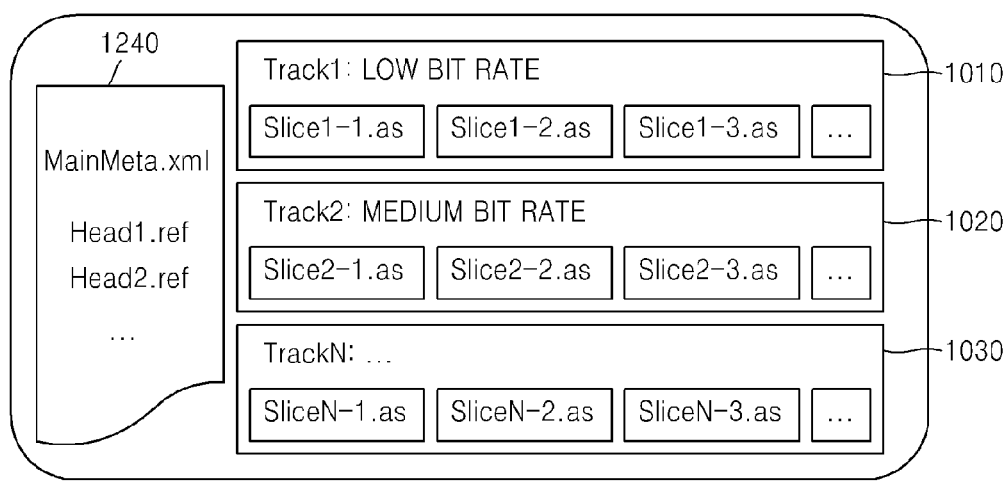
FIGS. 12A and 12C each illustrate a plurality of media data according to other exemplary embodiments.
Figure 12B:
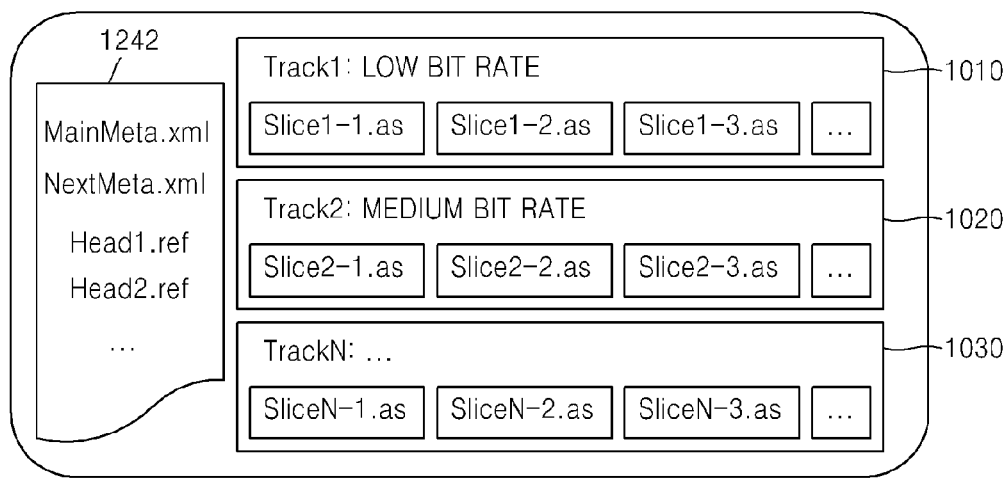
Figure 12C:
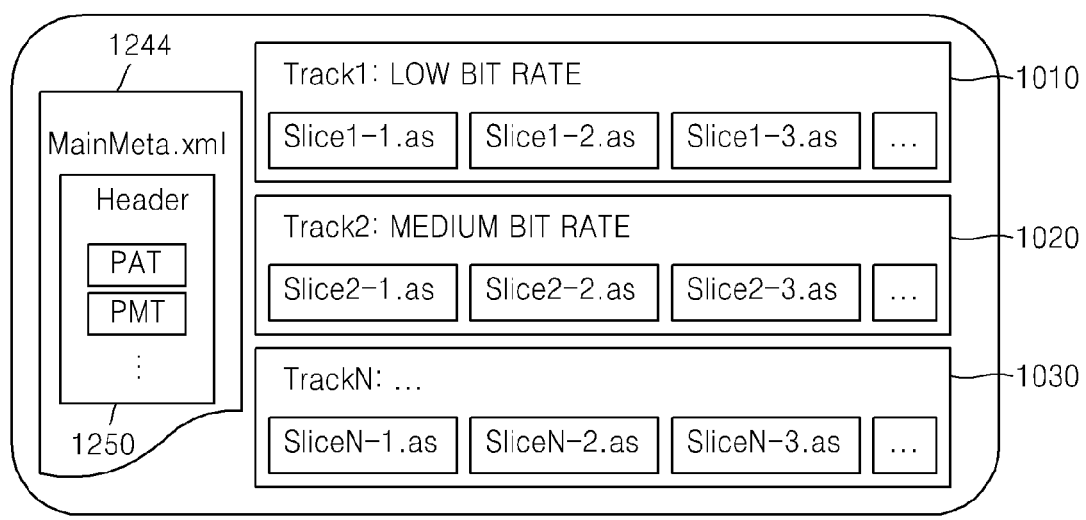

FIGS. 12A through 12C each illustrate a plurality of media data according to other exemplary embodiments. For example, FIGS. 12A through 12C each illustrate the plurality of media data included in the server 120, which are used to perform the streaming methods of FIGS. 11A and 11B.

Referring to FIG. 12A, the server 120 may include the plurality of media data 1010 through 1030 generated by encoding one content to have the plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 used by the client 130 to access the plurality of media data 1010 through 1030, wherein the server 120 includes information about the plurality of media data 1010 through 1030 and not information about content, unlike the exemplary embodiment of FIG. 10A. Here, the client 130 may receive the information about content from another entity instead of the server 120, and access the plurality of media data 1010 through 1030 included in the server 120 based on the received information about content.

Referring to FIG. 12B, information 1242 used by the client 130 to access the plurality of media data 1010 through 1030 may be prepared by further including a "Next-Meta.xml" file to the information 1240 of FIG. 12A.

Referring to FIG. 12C, the header files of the plurality of media data 1010 through 1030 may exist in one header file 1250. The header files do not exist for each of the plurality of media data 1010 through 1030, but may be included in information 1244 used to access the plurality of media data 1010 through 1030, as one header file 1250. The header file 1250 corresponds to the header file 1050 of FIG. 10C.

Figure 13A:
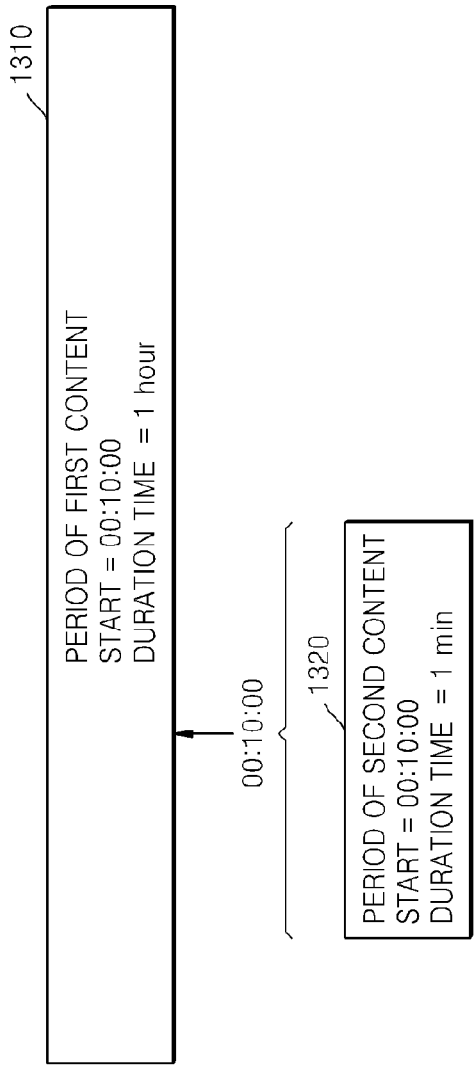
FIGS. 13A and 13B are diagrams of timelines when streaming is performed by inserting other content into main content while streaming the main content, according to exemplary embodiments.
Figure 13B:
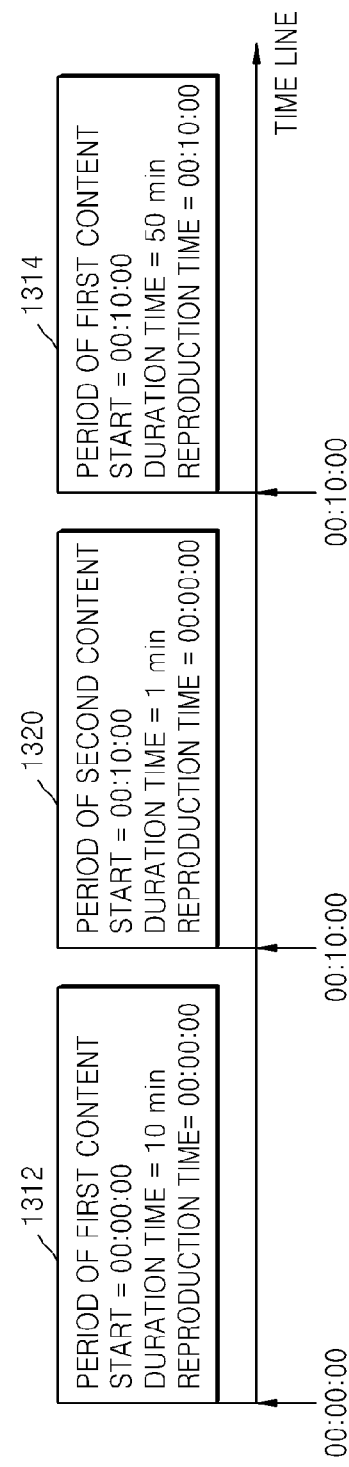

FIGS. 13A and 13B are diagrams of timelines when streaming is performed by inserting other content into main content while streaming the main content, according to exemplary embodiments. Hereinafter, "period" refers to a period assigned to predetermined content.

When a period 1310 of first content is determined as shown in FIG. 13A, second content is inserted after "00:10:00" has passed from a streaming of the first content. The second content may be related to the first content and may be advertisement content. "Start" is a time set based on the first content, and denotes a time when each period starts, and "duration time" denotes a time of continuously reproducing content in each period.

FIG. 13B shows a timeline of the first and second contents when the second content is inserted as shown in FIG. 13A. Referring to FIG. 13B, the period 1310 is divided into a period 1312 before the second content is inserted, and a period 1314 after the second content is inserted, according to insertion of the second content.

A reproduction time is set based on content reproduced in each period, and since the second content is inserted after "00:10:00" has passed from when the first content is reproduced, a reproduction time of the period 1314 after the second content is inserted is "00:10:00." Similarly, a reproduction time of a period 1320 of the second content is "00:00:00" due to the reproduction time being set based on the second content.

Figure 13C:
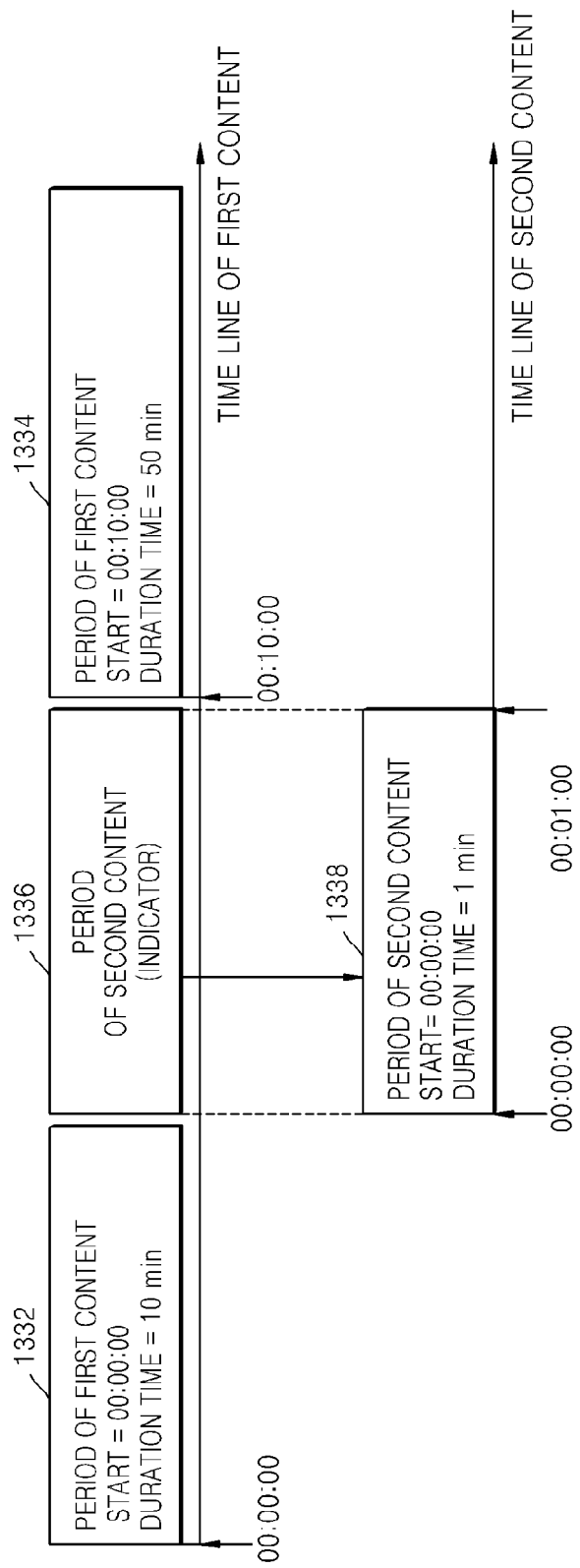
FIG. 13C is a diagram of a timeline of main content and a timeline of inserted content according to an exemplary embodiment.

FIG. 13C is a diagram of a time line of main content and a time line of inserted content according to an exemplary embodiment.

Referring to FIG. 13C, a period of first content is divided into two periods 1332 and 1334 in front of and at the rear of a period 1338, as the period 1338 of second content is inserted into the period of the first content. Along a timeline of the first content, the first content is reproduced in the period 1332, and the second content is reproduced according to an indicator 1336 indicating that the period 1338 is inserted. As will be described below, an indicator 1336 is a tag including information about a period of second content, and may be a tag including location information about media data of the second content or location information of a second file including the location information about the media data of the second content.

A media presentation description provided to the client 130 so as to reproduce main content, i.e., the first content, may include such an indicator 1336, and the client 130 may reproduce the first and second contents by classifying the periods 1332 and 1334 of the first content and the period 1338 of the second content based on the indicator 1336 included in the media presentation description.

Referring to FIG. 13C, a plurality of timelines are used for continuous reproduction of the first and second contents. A timeline of the second content exists separately from the timeline of the first content, and since the period 1338 of the second content is first inserted after 10 minutes is passed after the first content is reproduced, the timeline of the second content starts after 10 minutes based on the reproduction time of the first content. Since the timelines are separately set for the first and second contents, and times are individually set in each timeline, movement between the timelines is not possible. For example, it is not possible to move to 30 seconds in the timeline of the second content after 1 minute has passed after the first content is reproduced along the timeline of the first content, and movement is possible only along the timeline of the first content if the first content is being reproduced currently.

Figure 14A:
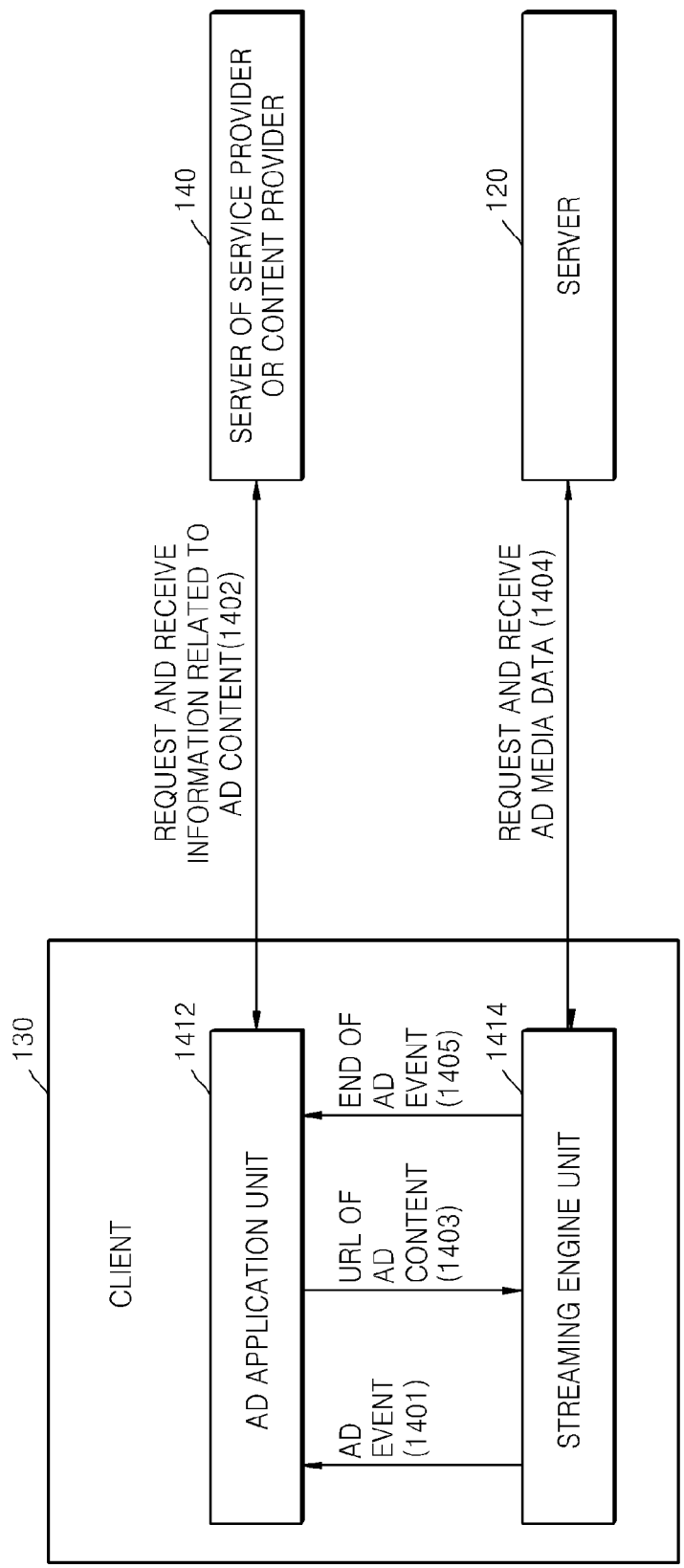
FIGS. 14A and 14B are diagrams for respectively describing dynamic advertisement content insertion and static advertisement content insertion, according to exemplary embodiments.
Figure 14B:
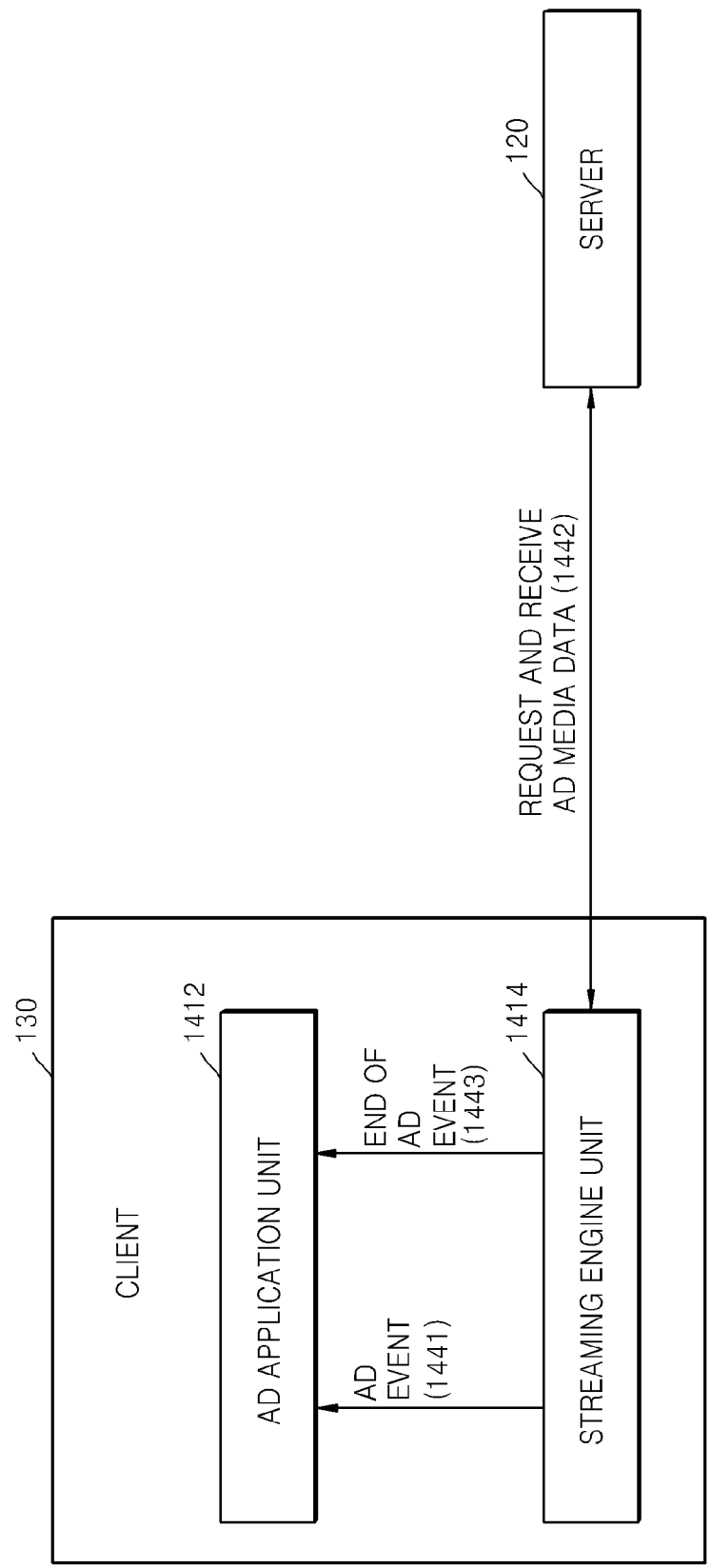

FIGS. 14A and 14B are diagrams for respectively describing dynamic advertisement content insertion and static advertisement content insertion, according to exemplary embodiments. Advertisement content may correspond to the second content of FIGS. 13A and 13B. Hereinafter, "advertisement content" refers to commercial content inserted during a reproduction of main content.

FIG. 14A illustrates an exemplary embodiment of dynamically inserting advertisement content. Referring to FIG. 14A, the client 130 inserts the advertisement content into main content while receiving and reproducing the main content from the server 120. The main content is received from the server 120 and reproduced in a streaming method and is stopped from being reproduced, and then the advertisement content is reproduced. The client 130 inserts and reproduces the advertisement content by using a streaming engine unit 1414, which performs streaming of the main content and the advertisement content, i.e., requests, receives and reproduces the main content and the advertisement content, and an advertisement application unit 1412, which inserts the advertisement content.

The streaming engine unit 1414 receives the main content from the server 120, and reproduces the main content. As described above, the streaming engine unit 1414 may receive at least one of a plurality of media data generated by encoding the main content to have different qualities for adaptive streaming. Here, a media presentation description of the main content is received, and the at least one media data is requested and received based on the received media presentation description. Each media data may include a plurality of segments generated by dividing the main content based on time, for the adaptive streaming described above.

When it is a time to insert the advertisement content while receiving and reproducing the main content from the server 120, the streaming engine unit 1414 notifies the advertisement application unit 1412 that an advertisement event is generated in operation 1401. Upon receiving the notification about the advertisement event, the advertisement application unit 1412 requests the server 140 of a service provider or content provider for information related to the advertisement content, and receives the information related to the advertisement content in response to the request in operation 1402. The information related to the advertisement content may be location information, such as a URL, of the advertisement content.

The advertisement content to be inserted is not predetermined when the main content starts to be reproduced, but is dynamically inserted into the main content since the information related to the advertisement content is received from the server 140 when the advertisement event is generated, and the advertisement content is determined based on the received information.

In operation 1403, the advertisement application unit 1412 transmits the information received in operation 1402, i.e., the URL of the advertisement content, to the streaming engine unit 1414.

In operation 1404, the streaming engine unit 1414 requests the advertisement content based on the information received in operation 1403, and receives advertisement media data in response to the request. The advertisement media data may be a plurality of media data encoded according to different qualities, like the main content.

After the receiving and reproducing of the advertisement content is completed, the streaming engine unit 1414 notifies the advertisement application unit 1412 that the advertisement event is ended and reproduces the main content again in operation 1405. The main content is reproduced from a point of time when it was stopped due to the insertion of the advertisement content, and the main content is reproduced again at the time when the advertisement content is inserted as described above with reference to FIG. 13B.

FIG. 14B illustrates an exemplary embodiment of statically inserting advertisement content.

Referring to FIG. 14B, in operation 1441, the advertisement application unit 1412 notifies the advertisement application unit 1412 that an advertisement even is generated when it is time to insert the advertisement content while receiving and reproducing main content from the server 120.

In operation 1442, the streaming engine unit 1414 requests the advertisement content from the server 120, and receives advertisement media data in response to the request. Like the main content, the advertisement media data may be at least one of a plurality of media data encoded according to different qualities.

The exemplary embodiment of FIG. 14B relates to inserting static advertisement content, wherein advertisement content to be inserted is predetermined. A media presentation description of the main content received from the server 120 for reproduction of the main content includes information about the advertisement content to be inserted, and the streaming engine unit 1414 requests and receives the advertisement content by referring to the information about the advertisement content included in the media presentation description.

After the receiving and reproducing of the advertisement content is completed, the streaming engine unit 1414 notifies the advertisement application unit 1412 that the advertisement event is ended, and reproduces the main content again in operation 1405.

In FIGS. 14A and 14B, both the main content and the advertisement content are provided by the server 120. However, it is understood to one of ordinary skill in the art that the main content and the advertisement content may be provided by different servers.

Figure 15A:
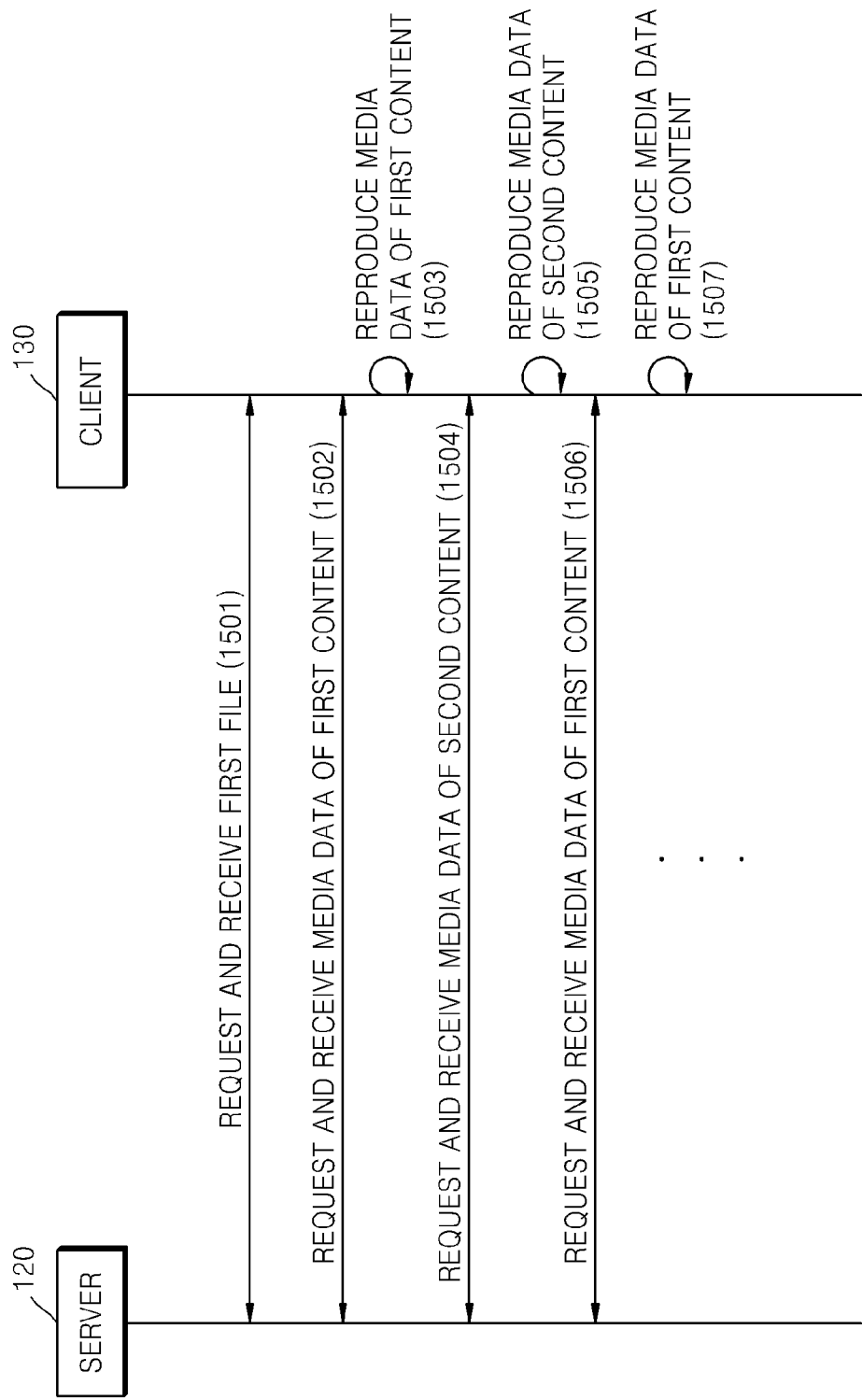

FIG. 15A is a flowchart illustrating a method of reproducing other content by inserting the other content into main content, according to an exemplary embodiment.

Referring to FIG. 15A, the client 130 requests the server 120 for a first file including location information about media data of first content, in operation 1501. The first content corresponds to the main content. The first file may be a media presentation description of the first content. The client 130 may request the server 120 for the media presentation description of the first content by using an HTTP request, and receive the media presentation description of the first content as an HTTP response.

Unlike the method of FIG. 11A, the method of FIG. 15A reproduces second content by inserting the second content into the first content. Accordingly, the media presentation description received in operation 1501 includes information about a period of the first content and information about a period of the second content, wherein the information about the period of the second content includes location information about media data of the second content. The media presentation description according to exemplary embodiments will now be described in detail with reference to FIGS. 16A through 16E.

FIGS. 16A through 16E are media presentation descriptions of main content including information about inserted content, according to exemplary embodiments.

Referring to FIG. 16A, the media presentation description of the first content received by the client 130 in operation 1501 according to an exemplary embodiment includes the information about the period of the first content and the information about the period of the second content. The media presentation description may be an XML file including a tag about the period of the first content and a tag about the period of the second content. In the present exemplary embodiment, a period is defined based on "start" and "Type" attributes.

The "start" attribute denotes a starting time of the period, and is set based on main content. Accordingly, a "start" attribute of a second "Period" tag constituting the information about the period of the second content may be set identically to a "start" attribute of a third "Period" tag constituting the information about the period where the first content is reproduced again. In other words, the "start" attributes of the second and third "Period" tags may be repeated according to the insertion of the second content, but since the second content is inserted while reproducing the first content, the repetition of the "start" attributes is exceptionally permitted.

The "Type" attribute defines whether a "Period" tag is a tag about the period of the main content, i.e., the first content, or a tag about the period of the inserted content, i.e., the second content. When the "Type" attribute is "Internal," the "Period" tag is the tag about the period of the main content, and when the "Type" attribute is "External," the "Period" tag is the tag about the period of the inserted content.

Since the inserted content is inserted at "00:15:00" based on the main content, a starting time of a second period where the "Type" attribute is "External" and a starting time of a third period where the "Type" attribute is "Internal" are the same. The inserted content is inserted and reproduced at "00:15:00" based on the main content, and when the inserted content is completely reproduced, the main content is reproduced again from "00:15:00."

Alternatively, as shown in the exemplary embodiment of FIG. 16B, a "Period" tag about a period of main content may not include a "Type" attribute, and only a "Period" tag about a period of inserted content may include a "Type" attribute. A "start" attribute indicating a starting time of each period is as shown in FIG. 16A.

Alternatively, as shown in the exemplary embodiment of FIG. 16C, a name of a tag about a period of inserted content may be differently set from a tag about a period of main content. Referring to FIG. 16C, the name of the tag about the period of the inserted content is "externalPeriod." The periods of the inserted content and the main content are classified from each other by differentiating the names, instead of based on the "Type" attributes as shown in FIGS. 16A and 16B. A "start" attribute indicating a starting time of each period is as shown in FIG. 16A.

FIG. 16D illustrates a media presentation description when a plurality of contents is inserted into main content while reproducing the main content according to an exemplary embodiment. In FIG. 16D, three contents may be inserted at "00:15:00" while reproducing the main content. Since all three contents are inserted while reproducing the main content, "Type" attributes of "Period" tags are the same, i.e., "External," and starting times are the same, i.e., "00:15:00," based on the main content. However, the three contents are classified by "externalID" attributes. The "externalID" attribute is an attribute for identifying each content, and may be any identifier, such as a URL, a uniform resource identifier (URI), a global unique identifier (GUID), etc.

According to the media presentation description of FIG. 16D, when the starting time "00:15:00" is reached, the client 130 reproducing the main content selects and inserts one of the three contents, which have the "Type" attributes of "External" and the "start" attributes of "00:15:00." Here, the client 130 may select content to be inserted based on the "externalID" attribute. A separate description may be provided to the client 130 for content selection. The separate description may be separately provided to the client 130 independently from the media presentation description of FIG. 16D, or provided to the client 130 in the media presentation description. For example, the content selection may be supported by providing the client 130 a description indicating that content having an "externalID" attribute of "A/a/aaa/a" is an advertisement about a car and content having an "external ID" attribute of "B/b/bbb/advertisement" is an advertisement about a book.

In FIGS. 16A through 16D, a "start" attribute of a "Period" tag is defined based on main content. In other words, the "start" attribute is defined based on a reproduction time of the main content, despite the insertion of other content, such as the timeline of FIG. 13B. However, a "start" attribute may be defined based on actual elapsed time instead of reproduction time of main content, as shown in FIG. 16E. FIG. 16E illustrates a media presentation description when other content having a duration time of "00:01:00" is inserted into main content at "00:15:00" while reproducing the main content according to an exemplary embodiment. Referring to FIG. 16E, a "start" attribute of a third "Period" tag for continuous reproduction of the main content is defined to be "00:16:00," i.e., an elapsed time for reproducing the main content and the other content.

In FIG. 16E, an actual starting time based on the main content in the third "Period" tag is "00:15:00," and the "start" attribute is "00:16:00." Thus, the actual starting time is different from a starting time defined by the third "Period" tag.

Referring back to FIG. 15A, in operation 1502, the client 130 requests media data of the first content, i.e., the main content, based on the first file received in operation 1501, and receives the media data in response to the request. The media data of the first content is requested and received based on the information about the period of the first content included in the first file. The client 130 requests the server 120 to transmit at least one of a plurality of media data generated by encoding the first content to have different qualities and receives the at least one media data from the server 120.

While reproducing the first content in operation 1503, the client 130 requests media data of the second content and receives the media data in response to the request in operation 1504. As described above with reference to FIGS. 16A through 16E, the first file, i.e., the media presentation description, received in operation 1501, also includes the information about the period of the second content, wherein the information about the period of the second content includes location information about the media data of the second content.

Accordingly, the client 130 determines an inserting time of the second content based on the "start" attribute described above with reference to FIGS. 16A through 16E, and requests the server 120 for the second content and receives the second content from the server 120 at the insertion time. The second content may be inserted statically or dynamically as will be described below with reference to FIGS. 17A through 17C.

FIGS. 17A through 17C are media presentation descriptions of main content including information about inserted content, according to other exemplary embodiments.

Referring to the exemplary embodiment of FIG. 17A, a "Period" tag includes a "start" attribute as shown in FIGS. 16A through 16E. Also, the "Period" tag includes "Representation" tag and "SegmentInfo" tag as sub tags. The "Representation" tag includes information about each of a plurality of media data, and the "SegmentInfo" tag includes information about at least one segment included in each of media data. The information about each of the plurality of media data may be location information, for example, URLs, of the plurality of media data.

An "AD" tag includes information about a period of second content, for example, advertisement content, inserted while reproducing the first content, and includes a "start" attribute based on the first content as shown in FIGS. 16A through 16E, and a "forcePlayout" attribute indicating whether the second content is forcibly reproduced. If the "forcePlayout" attribute is set to be "true," the second content is reproduced without fail, and cannot be stopped and/or skipped. In FIG. 17A, the second content is inserted twice, at "00:03:10" and "00:05:10."

As described above, the information about the period of the second content includes the location information about the media data of the second content. However, the second content is dynamically inserted in FIG. 17A, and the location information about the media data of the second content is not defined in detail in the media presentation description of the first content. Accordingly, the "AD" tag is interpreted to implicitly include the location information about the media data of the second content that is dynamically inserted. In other words, the location information about the media data of the second content included in the media presentation description of the first content is considered to be set as location information about media data of content that is dynamically inserted.

Referring to FIG. 17B, the information about the period of the second content may be defined by using a separate tag at a beginning or an end of the media presentation description according to an exemplary embodiment. A "ProgramInsertion" tag including the information about the period of the second content may be separately defined, and at least one "Program" tag including information about at least one period of second content may be defined. Each "Program" tag includes a "startTime" attribute defining an insertion time. Like FIG. 17A, a "forcePlayout" attribute may be included to define forcible reproduction. As described above, the information about the period of the second content includes the location information about the media data of the second content. Accordingly, the media presentation description of FIG. 17B includes a "url" attribute. However, the "url" attribute is not defined in detail like in FIG. 17A, for dynamic insertion of the second content.

In FIG. 17C, the second content is statically inserted according to an exemplary embodiment. Comparing FIG. 17C with FIG. 17A, a second "Period" tag having a "start" attribute of "00:03:10" includes a URL of the media data of the inserted second content in FIG. 17C. In FIG. 17C, "http://ad.content.com/ad01/" is the URL of the media data. As described above, the second content, which is inserted while reproducing the first content, may be a plurality of media data generated by encoding the second content to have different qualities, and each of media data may include at least one segment. Accordingly, the second "Period" tag includes a "Representation" tag and a "SegmentInfo" tag.

Referring back to FIG. 15A, while reproducing the second content in operation 1505, the client 130 requests the media data of the first content and receives the media data in response to the request in operation 1506, and reproduces the first content again in operation 1507. After the period of the second content inserted while reproducing the first content is completed, the first content is reproduced again from a time when the first content has stopped being reproduced.

In FIG. 15A, if reproducing of the second content is not necessary, the reproducing of the second content may be ignored and the first content may be continuously reproduced. However, if the "forcePlayOut" attribute is defined to be "true" as shown in FIGS. 17A through 17C, the period of the second content is not ignored, and the second content is inserted and reproduced while reproducing the first content.

Also, in FIG. 15A, the server 120 provides the first content, i.e., the main content, and the second content, i.e., the advertisement content. However, it is understood that another exemplary embodiment is not limited thereto, and the main content and the advertisement content may be provided by different servers. In other words, a server of the main content and a server of the advertisement content may be separated, and operation 1502 and operation 1504 may be performed by different entities. Also, a server for providing the first file may not be the same as a server for providing the first content according to another exemplary embodiment.

Figure 18:
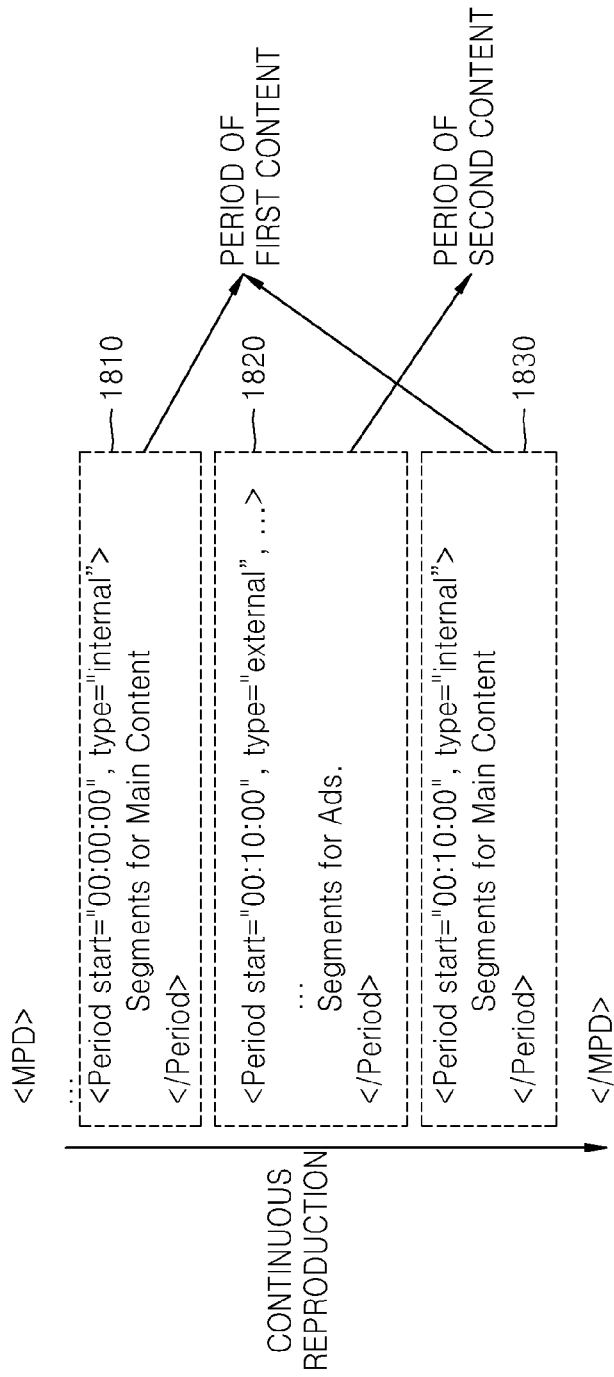
FIG. 18 is a diagram of a media presentation description of main content including information about inserted content and periods corresponding to the media presentation description, according to an exemplary embodiment.

FIG. 18 is a diagram of a media presentation description of main content including information about inserted content and periods corresponding to the media presentation description, according to an exemplary embodiment. FIG. 18 will be described with reference to a case when the first and second contents are reproduced based on the first file received by the client 130 in operation 1501 of FIG. 15A.

Referring to FIG. 18, the media presentation description according to the current exemplary embodiment includes the information about the period of the first content and the information about the period of the second content. A "Period" tag 1820 about the period of the second content is inserted between "Period" tags 1810 and 1830 about the period of the first content.

According to FIG. 15A, the "Period" tags 1810 through 1830 each include location information about media data reproduced in each period, wherein each of media data may include a plurality of segments divided based on time.

FIG. 15B is a flowchart illustrating a method of reproducing other content by inserting the other content into main content, according to another exemplary embodiment.

Referring to FIG. 15B, the client 130 requests the server 120 for a first file including location information about a plurality of media data of first content, in operation 1511. The first content corresponds to main content. The first file may be a media presentation description of the first content. The client 130 may request the server 120 for the media presentation description of the first content by using an HTTP request, and receive the media presentation description of the first content as an HTTP response.

The media presentation description received by the client 130 in operation 1511 may include information about a period of the first content and information about a period of second content, as in FIG. 15A. However, the first file received by the client 130 in operation 1501 of FIG. 15A includes the location information, for example a URL, of the media data of the second content, whereas the first file received by the client 130 in operation 1511 includes location information, for example, a URL, of a second file including location information about media data of the second content.

In operation 1512, the client 130 requests the server 120 for the second file, and receives the second file in response to the request. Operation 1512 will now be described in detail with reference to FIGS. 19A, 19B, and 20.

FIGS. 19A and 19B respectively illustrate a media presentation description of main content and a file including information about inserted content, according to exemplary embodiments.

Referring to the exemplary embodiment of FIG. 19A, the media presentation description of the first content received by the client 130 in operation 1511, i.e., the first file, includes the location information of the second file including the location information about the media data of the second content.

The location information about the media data of the first content, i.e., the main content, is defined by a "Period" tag and a "Representation" tag, and the URL of the second file including the location information about the media data of the second content, i.e., the inserted content, is defined by a "moreInformationURL" attribute of a "ProgramInformation" tag.

In all of the media presentation descriptions of FIGS. 16A through 16E, 17A through 17C, and 18, the location information about the media data of the second content is defined in the "Period" tag of the first file. Both dynamic content insertion and static content insertion are performed as defined in the "Period" tag. However, the media presentation description of first content in FIG. 19A includes the URL of the second file. Upon receiving the media presentation description of the first content, the client 130 inserts the second content by referring to a "programinsertion.xml" file defined by a "moreInforamtionURL" attribute.

FIG. 19B illustrates the second file, i.e., the "programinsertion.xml" file, including the location information about the media data of the second content according to an exemplary embodiment. The client 130 receives the first file of FIG. 19A in operation 1511, and receives the second file of FIG. 19B in operation 1512 based on the received first file. Referring to FIG. 19B, the "programinsertion.xml" file including information about the inserted content includes a "Program" tag as a sub tag of a "programinsertion" tag, and an insertion time and forcible reproduction of the second content may be determined according to a "startTime" attribute and a "forcePlayOut" attribute of the "Program" tag.

When the second content is dynamically determined, a "url" attribute of the "Program" tag is not defined, and when the second content is statically determined, the "url" attribute may be defined. The "url" attribute of the "Program" tag is the location information of the media data of the second content, and since the second file of FIG. 19B does not define the "url" attribute, the media data of the second content may be dynamically determined.

Figure 20:
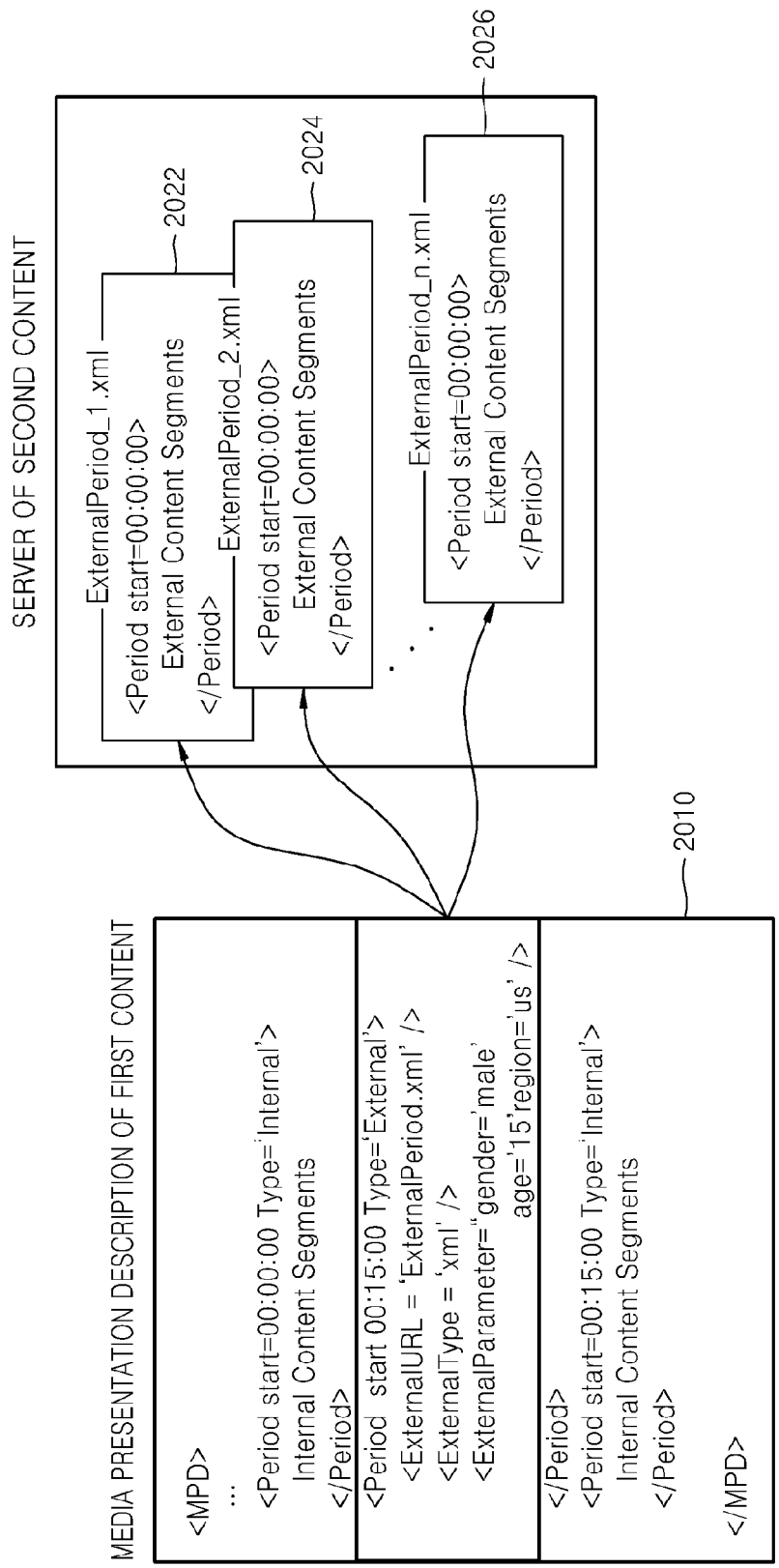
FIG. 20 is a diagram of a media presentation description of main content and a plurality of files including information about inserted content, according to an exemplary embodiment.

FIG. 20 is a diagram of a media presentation description of main content and a plurality of files including information about inserted content, according to an exemplary embodiment.

Referring to FIG. 20, a media presentation description 2010 of the first content received by the client 130 in operation 1511 may include the information about the period of the second content. A "Period" tag having a "start" attribute of "00:15:00" and a "Type" attribute of "External" is a tag that defines the information about the period of the second content. A tag about the period of the second content is a sub tag, and may include "ExternalURL," "ExternalType," and "ExternaParameter" tags.

The "ExternalURL" tag defines the URL of the second file described above. The "ExternalURL" tag is a tag for accessing external media data or an external file, and any XML tag that performs the same function as the "ExternalURL" tag may be used instead of the "ExternalURL" tag. For example, an "xlink" tag of an XML linking language or an "xinclude" tag of XML inclusion may be used instead of the "ExternalURL" tag.

The "ExternalType" tag defines a type of the "ExternalURL" tag. As shown in FIG. 15B, when the media presentation description 2010 of the first content includes the location information of the second file and not the location information about the media data of the second content, the "ExternalType" tag may be defined as "xml" as shown in FIG. 20. However, when the media presentation description 2010 of the first content further includes the location information about the media data of the second content as shown in FIG. 15A, i.e., when the "ExternalURL" tag defines the location information of the media data of the second content, the "External Type" tag may be defined as "data".

In FIG. 20, a plurality of the second contents may be inserted while reproducing the first content. Accordingly, a server for providing the second content may provide one of a plurality of files, i.e., "ExternalPeriod_1.xml" 2022, "ExternalPeriod_2.xml" 2024, and "ExternalPeriod_3.xml" 2026 to the client 130, as the second file corresponding to "ExternaPeriod.xml" defined in the "ExternalURL" tag of the media presentation description 2010 of the first content.

The "ExternalPeriod_1.xml" 2022, the "ExternalPeriod_2.xml" 2024, and the "ExternalPeriod_3.xml" 2026 may include location information about media data of different contents, and the media data may include a plurality of segments generated by dividing the media data based on time. Also, each of the "ExternalPeriod_1.xml" 2022, the "ExternalPeriod_2.xml" 2024, and the "ExternalPeriod_3.xml" 2026 may include location information about a plurality of media data generated by encoding content to have different qualities.

An "ExternalParameter" tag includes parameters for selecting one of the plurality of files. The "ExternalParameter" tag may include a parameter about at least one of a user profile and preference of the client 130. The client 130 may transmit the parameter about at least one of the user profile and preference to the server 120, and the server 120 may select and transmit one of the "ExternalPeriod_1.xml" 2022, the "ExternalPeriod_2.xml" 2024, and the "ExternalPeriod_3.xml" 2026 to the client 130 based on the received parameter. Periods having different duration times and different contents may be set by using the "ExternalPeriod_1.xml" 2022, the "ExternalPeriod_2.xml" 2024, and the "ExternalPeriod_3.xml" 2026. The profile of the client 130 may be about at least one of an age, a gender, a residential region, etc., of the user of the client 130.

Referring back to FIG. 15B, operation 1512 may not be performed immediately after operation 1511. In other words, the second file may not be received immediately after the first file is received. For example, as shown in FIG. 20, the second file may be received before the period of the second content starts while receiving and reproducing the first content, if the insertion time of the second content is determined by the first file.

In operation 1513, the client 130 requests the first content, i.e., the media data of the main content, based on the first file received in operation 1511, and receives the media data in response to the request. The client 130 requests and receives the media data of the first content based on information included in the first file. The client 130 requests the server 120 to transmit at least one of the plurality of media data generated by encoding the first content to have different qualities, and receives the at least one media data.

While reproducing the first content in operation 1514, the client 130 requests the media data of the second content and receives the media data in response to the request in operation 1515. As described above with reference to FIGS. 19A, 19B, and 20, the media data of the second content is requested and received based on the second file received in operation 1512. The second file received in operation 1512 includes the information about the media data of the second content, and thus the second content is requested and received based on the second file.

As shown in FIGS. 19A and 19B, the insertion time of the second content is determined based on the second file, and the second content may be reproduced from the determined insertion time. Alternatively, as shown in FIG. 20, the insertion time of the second content may be determined based on the "start" attribute including the information about the period of the second content included in the media presentation description 2010 of the first content, and the second content may be reproduced from the determined insertion time.

After reproducing the second content in operation 1516, the client 130 requests the media data of the first content, receives the media data in response to the request in operation 1517, and reproduces the first content in operation 1518. The first content is reproduced again from a time when the reproducing of the first content was stopped, after the period of the second content inserted while reproducing the first content is completed.

In FIG. 15B, the reproducing of the second content may be skipped if the reproducing of the second content is not essential, and the first content may be continuously reproduced as described with reference to FIG. 15A.

Also, though in FIG. 15B, the first file, the second file, the first content, and the second content are all provided through the same server 120, it is understood to one of ordinary skill in the art that at least one of the first file, the second file, the first content, and the second content may be provided by a server other than the server 120 of FIG. 15B according to one or more other exemplary embodiments.

Figure 21:
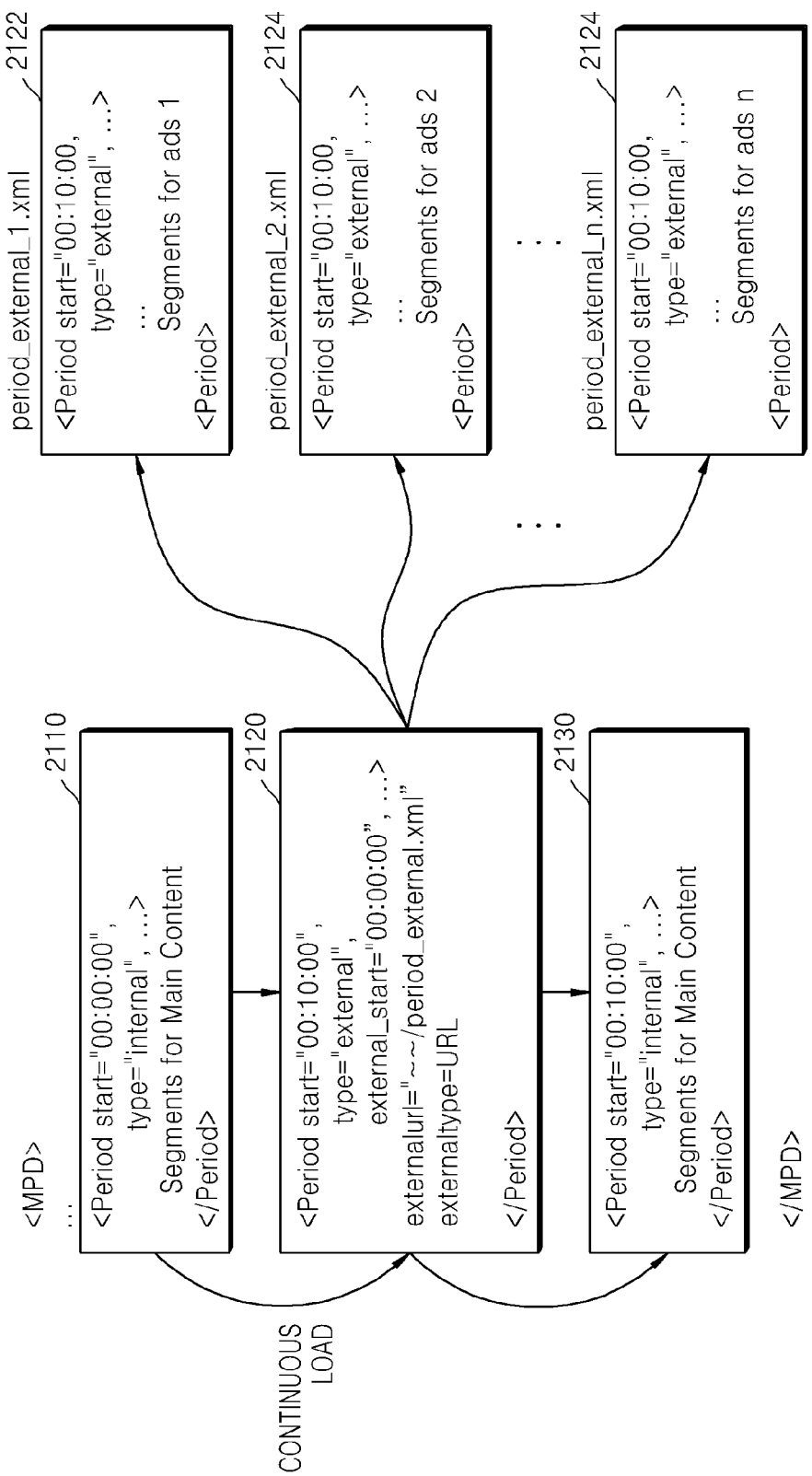
FIG. 21 is a diagram of a media presentation description of main content, a file including information about inserted content, and periods corresponding to the media presentation description, according to an exemplary embodiment.

FIG. 21 is a diagram of a media presentation description of main content, a file including information about inserted content, and periods corresponding to the media presentation description, according to an exemplary embodiment. FIG. 21 will be described with reference to a case when the first content is reproduced based on the first file received by the client 130 in operation 1511 of FIG. 15B and the second content is reproduced based on the second file received by the client 130 in operation 1512 of FIG. 15B.

Referring to FIG. 21, the media presentation of the first content according to the current exemplary embodiment includes a "Period" tag 2120 about the period of the second content inserted while reproducing the first content. The "Period" tag 2120 about the period of the second content is inserted between "Period" tags 2110 and 2130 about the period of the first content.

The media data of the first content is reproduced in the period of the first content since the "Period" tags 2110 and 2130 about the period of the first content includes the location information about the media data of the first content reproduced in each period.

The "Period" tag 2120 about the period of the second content defines "~~/period_external.xml" as information about the second file including the location information about the media data of the second content. Accordingly, the client 130 receives one of a plurality of second files 2122 through 2126 based on the URL. All "start" attributes of the second files 2122 through 2126 are defined as "00:10:00" like a "start" attribute of the "Period" tag 2120 of the first file.

An "external_start" attribute defined in the "Period" tag 2120 of the first file defines a starting time based on the second content. Also, duration times of the plurality of different contents defined by the second files 2122 through 2126 may be differently set. For example, a length of second content defined by "period_external_1.xml" may be "00:00:30," and a length of second content defined by "period_external_2.xml" may be "00:01:00." Since one of the second files 2122 through 2126 is transmitted to the server 120 after being selected based on the user profile and preference of the client 130, the duration time may be differently set and inserted based on the user profile and preference of the client 130. Also, the second contents inserted while reproducing the first content may be differently set since the second files 2122 through 2126 include the location information about the media data of the different second contents.

Each of the "Period" tags 2110 and 2130 about the period of the first content and "Period" tags of the second files 2122 through 2126 may include the location information about the plurality of media data generated by encoding corresponding content to have different qualities, and each of the media data may include a plurality of segments generated by dividing the media data based on time.

According to the tags including the information about the period of the second content, included in the media presentation description described above, the second content is inserted while reproducing the first content. However, the tags including the information about the period of the second content may be set in such a way that the second content is not inserted while reproducing the first content.

When the period of the first content and the period of the second content are already determined and cannot be changed, a user reproduces the inserted second content while reproducing the first content. The second content is reproduced when the segments of the first content and the segments of the second content are already combined and form one media data. Here, the insertion of the second content may be ignored by using the media presentation description, without having to reproduce the second content.

Information about the insertion time of the second content, information about the duration time of the second content, and information indicating whether the second content is reproduced may be defined by the tag including the information about the period of the second content of the media presentation description. Each of an "insertiontime" attribute about the insertion time, a "duration" attribute about the duration time, and an "onofflag" attribute about the reproduction of the second content may be defined by the tag including the information about the period of the second content. When the period of the second content is ignored, the "onofflag" attribute may be defined to be "off."

When it is obvious that the period of the second content is ignored and the "onofflag" attribute is not to be set, only the "insertiontime" attribute and the "duration" attribute are defined, thereby skipping the period of the second content.

Figure 22:
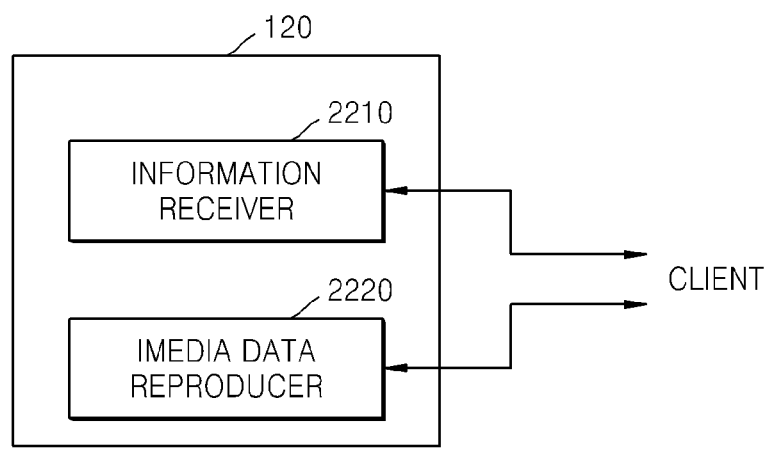
FIG. 22 is a diagram of a server according to an exemplary embodiment.

FIG. 22 is a diagram of the server 120 according to an exemplary embodiment.

Referring to FIG. 22, the server 120 according to the current exemplary embodiment includes an information transmitter 2210 and a media data transmitter 2220.

The information transmitter 2210 receives a request to transmit predetermined information from the client 130, and transmits the requested information in response to the request. The server 120 receives a request to transmit the first file, i.e., the media presentation description, including the information about the period of the first file and the information about the period of the second content from the client 130, and transmits the requested media presentation description to the client 130. The media presentation description of the first content, i.e., the main content, such as is illustrated in FIGS. 16A through 16E, 17A through 17C, 18, 19A, 20, and 21, may be transmitted to the client 130. For example, the server 120 may receive an HTTP request requesting the media presentation description from the client 130, and may transmit the media presentation description as an HTTP response.

As shown in FIG. 15B, if the client 130 again requests the second file including the location information about the media data of the second file that is inserted while reproducing the first content, based on the first file, the information transmitter 2210 may transmit the second file such as is shown in FIGS. 19B, 20, and 21 to the client 130. When the first file does not include the location information about the media data of the second file, but includes the URL of the second file, the second file may be transmitted to the client 130. As shown in FIGS. 20 and 21, one of the plurality of second files may be selected and transmitted to the client 130.

The media data transmitter 2220 receives a request to transmit the first or second content from the client 130, and transmits the requested first or second content to the client 130. When the client 130 requests the first or second content based on the first file transmitted by the information transmitter 2210 as shown in FIG. 15A, or based on the first and second files transmitted by the information transmitter 2210 as shown in FIG. 15B, the server 120 transmits the requested first or second content to the client 130.

The server 120 receives and stores the plurality of media data generated by encoding the first content to have different qualities from the encoding device 110, and transmits requested media data when the client 130 requests at least one media data selected according to the streaming environment. When the client 130 requests the second content as the period of the second content starts while reproducing the first content, at least one media data selected according to the streaming environment from among the plurality of media data generated by encoding the second content to have different qualities is transmitted.

While in FIG. 22, the first file, the second file, the first content, and the second content are all provided by the same server 120, it is understood to one of ordinary skill in the art that at least one of the first file, the second file, the first content, and the second content may be provided by a server other than the server 120 of FIG. 22. For example, the first file and the first content may be provided by the server 120 of FIG. 22, and the second file and the second content may be provided by an advertisement server separately included to provide an advertisement.

Figure 23:
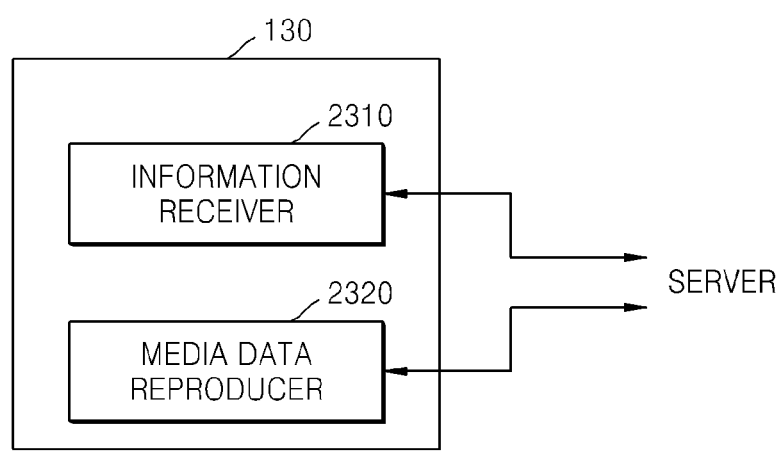
FIG. 23 is a diagram of a client according to an exemplary embodiment.

FIG. 23 is a diagram of the client 130 according to an exemplary embodiment.

Referring to FIG. 23, the client 130 according to the current exemplary embodiment includes an information receiver 2310 and a media data reproducer 2320.

The information receiver 2310 transmits a request to transmit predetermined information to the server 120, and receives the requested information from the server 120 in response to the request. The client 130 transmits a request to transmit the first file, i.e., the media presentation description, including the information about the period of the first file and the information about the period of the second content from the server 120, and receives the requested media presentation description from the server 120. The media presentation description of the first content, i.e., the main content, such as is illustrated in FIGS. 16A through 16E, 17A through 17C, 18, 19A, 20, and 21, may be received from the server 120. For example, the client 130 may transmit an HTTP request requesting the server 120 for the media presentation description, and may receive the media presentation description as an HTTP response.

As shown in FIG. 15B, the information receiver 2310 may again request the server 120 for the second file including the location information about the media data of the second file that is inserted while reproducing the first content, based on the first file, and receive the second file such as is shown in FIGS. 19B, 20, and 21 from the server 120. When the first file does not include the location information about the media data of the second file, but includes the URL of the second file, the server 120 may be requested for the second file and the second file may be received from the server 120. As shown in FIGS. 20 and 21, one of the plurality of second files may be received.

The media data reproducer 2320 transmits a request to transmit the first or second content to the server 120, and receives the requested first or second content from the server. The first or second content may be requested based on the first file received by the information receiver 2310 as shown in FIG. 15A, or based on the first and second files received by the information receiver 2310 as shown in FIG. 5B.

The client 130 may request at least one media data generated by encoding the first content to have different qualities, according to the streaming environment, and receive the requested at least one media data. When the period of the second content starts while reproducing the first content, the client 130 may select and request at least one of the plurality of media data generated by encoding the second content to have different qualities, according to the streaming environment, and receive the requested at least one media data. When the period of the second content is completed, at least one the media data of the first content is again requested and received.

The media data reproducer 2320 may include the advertisement application unit 1412 and the streaming engine unit 1414 described with reference to FIGS. 14A and 14B, and may dynamically insert the second content while reproducing the first content as in FIG. 14A or statically insert the second content while reproducing the first content as shown in FIG. 14B.

According to one or more exemplary embodiments, streaming can be performed by inserting other content without affecting streaming of main content, and thus the main content may be streamed by using any method. Also, commercial content, such as advertisement content, can be inserted, and thus the main content may be streamed according to a request of a content provider and a content user.

An exemplary embodiment can also be embodied as computer readable codes on a computer readable recording medium.

For example, a server and a client according to one or more exemplary embodiments may include a bus coupled to each unit of apparatuses of FIGS. 22 and 23, and at least one processor connected to the bus. Also, the streaming apparatuses may further include a memory coupled to the at least one processor, so as to store a command, a received message, or a generated message, wherein the at least one processor is connected to the bus to perform the command.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of reproducing media data, the method comprising:
   receiving a first file comprising information about period of a content, location information about a second file of external period and insertion information about the second file of the external period;
   receiving and reproducing at least one segment based on the received first file, wherein a plurality of media data, which is a set of encoded versions of the content, is presented during the period and the at least one segment is divided from one of the plurality of media data;
   receiving the second file based on the location information and insertion information; and
   receiving at least one external segment based on the second file,
   wherein the at least one external segment is divided from external media data of the external period, and
   wherein the location information indicates a location from which the second file is received and wherein the insertion information includes a forceplayout attribute indicating that the second file of the external period is accessed after a pre-determined event for referencing occurs.

2. The method of claim 1, wherein the information about the period of the content comprises location information about the plurality of media data of the content generated by encoding the content to have different qualities,
wherein each of the plurality of media data of the content comprises at least one segment generated by encoding the content to have a predetermined quality and dividing the encoded content based on time.

3. The method of claim 1, wherein the information about the external period comprises type information indicating whether the location information comprised in the information about the external period is location information about the external media data of the external period or location information of the second file.

4. The method of claim 1, wherein:
the second file is selected from among a plurality of second files based on at least one of a user profile and preference; and
the plurality of second files comprises a selective second file comprising information on a duration time and location information about media data of first selective content and another selective second file comprising information on a duration time and location information about media data of second selective content, different from the first selective content.

5. The method of claim 1, wherein:
the first file is an eXtensible Markup Language (XML) file comprising a first tag about the period of the content and a second tag about the period of the external period; and
the first and second tags each comprise an attribute indicating whether a corresponding tag is the first tag about the period of the content or the second tag about the external period.

6. The method of claim 1, wherein the external period is advertisement content.

7. The method of claim 1, wherein the receiving the at least one external segment comprises receiving and reproducing at least one external segment based on a start time attribute of the external period.

8. The method of claim 1, wherein:
the receiving and reproducing the at least one segment comprises receiving the at least one segment of the content from a first server; and
the receiving the at least one external segment comprises receiving the at least one external segment from a second server, different from the first server.

9. The method of claim 1, wherein the receiving the first file comprises receiving the first file as an HTTP response to an HTTP request.

10. The method of claim 1, wherein the receiving and reproducing the at least one segment comprises:
requesting and receiving a header of the media data of the content based on the received first file; and
requesting and receiving the at least one segment based on the received first file and the received header.

* * * * *